(12) United States Patent
Barnes et al.

(10) Patent No.: US 10,554,909 B2
(45) Date of Patent: Feb. 4, 2020

(54) SYSTEMS AND METHODS FOR SPECTRAL IMAGING WITH A TRANSMITTER USING A PLURALITY OF LIGHT SOURCES

(71) Applicant: GALILEO GROUP, INC., Melbourne, FL (US)

(72) Inventors: Donald Michael Barnes, Melbourne, FL (US); James Michael Grichnik, Vero Beach, FL (US); Zhihong Pan, San Jose, CA (US); Thorsten Mewes, Indialantic, FL (US)

(73) Assignee: GALILEO GROUP, INC., Melbourne, FL (US)

( * ) Notice: Subject to any disclaimer, the term of this patent is extended or adjusted under 35 U.S.C. 154(b) by 93 days.

(21) Appl. No.: 15/867,653

(22) Filed: Jan. 10, 2018

(65) Prior Publication Data

US 2018/0198993 A1 Jul. 12, 2018

Related U.S. Application Data

(60) Provisional application No. 62/444,731, filed on Jan. 10, 2017.

(51) Int. Cl.
*H04N 5/33* (2006.01)
*H04N 5/225* (2006.01)
*G06T 5/20* (2006.01)
*H04N 5/265* (2006.01)

(52) U.S. Cl.
CPC .............. *H04N 5/332* (2013.01); *G06T 5/20* (2013.01); *H04N 5/2252* (2013.01); *H04N 5/2254* (2013.01); *H04N 5/2256* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 6,021,344 A | 2/2000 | Lui et al. | |
| 6,427,022 B1 | 7/2002 | Craine et al. | |
| 6,608,628 B1 | 8/2003 | Ross et al. | |
| 6,671,737 B1 | 12/2003 | Snowdon et al. | |
| 7,213,766 B2 | 5/2007 | Ryan et al. | |
| 7,233,693 B2 | 6/2007 | Campbell | |
| 8,543,519 B2 | 9/2013 | Guyoin et al. | |

(Continued)

*Primary Examiner* — Talha M Nawaz
(74) *Attorney, Agent, or Firm* — Morgan, Lewis & Bockius LLP

(57) ABSTRACT

Systems and methods for imaging using a plurality of light sources is provided. An imaging device comprises a housing, a lens within the housing, a plurality of light source sets attached or integrated into the housing, a two-dimensional pixelated detector within the housing in optical communication with the lens, memory and a controller. Each respective light source set comprises a plurality of lights uniformly radially distributed about the lens. A first light source set in the plurality sets emits light substantially limited to a first spectral range. A second light source set in the plurality of sets emits light substantially limited to a second spectral range other than the first range. At least one program non-transiently stored in the memory and executable by the controller sequentially and independently fired each light source set while collecting light using the pixelated detector. An imaging device can be integrated with a mobile device.

21 Claims, 15 Drawing Sheets

(56) References Cited

U.S. PATENT DOCUMENTS

| | | |
|---|---|---|
| 8,743,219 B1 | 6/2014 | Bledsoe |
| 8,903,568 B1 | 12/2014 | Wang |
| 9,019,383 B2 | 4/2015 | Jung et al. |
| 9,280,038 B1 | 3/2016 | Pan et al. |
| 9,380,275 B2 | 6/2016 | Davidson et al. |
| 9,599,993 B2 | 3/2017 | Kumar |
| 9,606,535 B2 | 3/2017 | Humenay |
| 9,663,244 B2 | 5/2017 | Zhao et al. |
| 9,678,506 B2 | 6/2017 | Bachrach |
| 9,688,399 B1 | 6/2017 | Dobbins |
| 9,738,380 B2 | 8/2017 | Claridge et al. |
| 9,798,322 B2 | 10/2017 | Bachrach et al. |
| 9,942,511 B2 | 4/2018 | Jung et al. |
| 10,003,762 B2 | 6/2018 | Jung et al. |
| 2007/0052856 A1* | 3/2007 | Jung .................. H04N 1/2166 348/565 |
| 2009/0318815 A1 | 12/2009 | Barnes et al. |
| 2012/0233000 A1 | 9/2012 | Fisher et al. |
| 2012/0307056 A1* | 12/2012 | Zuzak .................. G01N 21/31 348/143 |
| 2012/0307081 A1* | 12/2012 | Dewald .................. G01J 3/10 348/207.11 |
| 2013/0100128 A1 | 4/2013 | Steedly et al. |
| 2013/0101223 A1 | 4/2013 | Kawanishi et al. |
| 2013/0136341 A1* | 5/2013 | Yamamoto ............. G06T 17/00 382/154 |
| 2013/0222369 A1* | 8/2013 | Huston .................. G06T 17/00 345/419 |
| 2013/0293686 A1 | 11/2013 | Blow et al. |
| 2014/0012459 A1 | 1/2014 | Kramer |
| 2014/0139639 A1 | 5/2014 | Wagner et al. |
| 2014/0257595 A1 | 9/2014 | Tillman |
| 2014/0307110 A1 | 10/2014 | Liu |
| 2014/0313303 A1* | 10/2014 | Davis ...................... A61B 5/68 348/77 |
| 2014/0340520 A1* | 11/2014 | Hay ..................... G01J 3/0264 348/148 |
| 2015/0087927 A1 | 3/2015 | Manzke |
| 2015/0134143 A1 | 5/2015 | Willenborg |
| 2016/0139595 A1 | 5/2016 | Yang et al. |
| 2018/0095464 A1 | 4/2018 | Takayama et al. |

\* cited by examiner

SYSTEMS AND METHODS FOR SPECTRAL IMAGING WITH A TRANSMITTER USING A PLURALITY OF LIGHT SOURCES

CROSS REFERENCE TO RELATED APPLICATIONS

The present application claims priority to U.S. Provisional Patent Application No. 62/444,731, filed Jan. 10, 2017, entitled "Hyperspectral Transmitter," which is hereby incorporated by reference in its entirety.

BACKGROUND

Field

The present disclosure relates to an imaging device. More particularly, the present disclosure relates to systems and method for imaging using a plurality of light sources.

Description of Related Art

In general, hyperspectral imaging is an imaging technique that integrates multiple images of a subject or region of interest resolved at various spectral bands into a single image, known as a hyperspectral/multispectral image. Each image of the multiple images represents a narrow spectral band acquired over a continuous spectral range. For example, a hyperspectral/multispectral imaging system may acquire at least two images, with each image taken using a different spectral band. The multiple images of the subject or region or interest can for example be sequentially captured and processed to generate the desired hyperspectral image. For the multiple images to be useful in generating a high quality hyperspectral image, however, the multiple images must be similar in composition and orientation. For instance, the subject or region of interest of the multiple images must be positioned nearly identical in each frame to allow for seamless combination.

Hyperspectral imaging devices have been utilized in various industries, from geological and agricultural surveying to medical diagnosis. Within the medical field, hyperspectral imaging has been utilized to facilitate complex diagnosis and predict or analyze treatment outcomes. Other such uses of a hyperspectral imaging device include material composition analysis, biometrics and the like.

Despite the enormous potential for hyperspectral imaging and devices thereof, there exists numerous hurdles that prevent such devices from being universally implemented. Conventional hyperspectral imaging devices utilize high-end optics and expensive hardware, yielding an exceptionally high manufacturing cost. These devices are often large and bulky, requiring significant weight and/or size.

Prior hyperspectral imaging devices typically reduce the total energy of a given system by applying a plurality of filters to a given signal. Such systems require light having a high intensity to ensure suitable transmission quality through the filter, which often consumes a large amount of power.

Additionally, since the component images are captured sequentially, ensuring that all of the component images are properly aligned can be difficult. This is especially true in the medical and military industry where a clinician or responder is capturing images of a subject or region of interest that may move, or who may be positioned in a way that makes capturing images of the subject or region of interest difficult.

Thus, prior to the present disclosure there existed a need for a hyperspectral imaging device that greatly reduces time required to capture hyperspectral images at significantly reduced costs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Advantageously, the hyperspectral/multispectral imaging device detailed in the present disclosure address the shortcomings in the prior art detailed above.

Various aspects of the present disclosure are directed to providing a hyperspectral/multispectral imaging device, non-transitory computer comprising at least one executable program, and a method thereof.

Device Embodiments. One aspect of the present disclosure provides an imaging device comprising a housing having an exterior and an interior. The imaging device also includes an objective lens within the housing which is flush with a surface of the housing. Thus, the objective lens does not substantially extend past the surface of the housing. A plurality of light source sets is attached or integrated into the housing. Each respective light source set in the plurality of light sources sets comprises a plurality of lights that is uniformly radially distributed about the objective lens. A first light source set in the plurality of light source sets emits light that is substantially limited to a first spectral range, and a second light source set in the plurality of light source sets emits light that is substantially limited to a second spectral range other than the first spectral range. A single two-dimensional pixelated detector is disposed within the housing and in optical communication with the objective lens. The imaging device includes a controller, comprising at least one program non-transiently stored in the controller and executable by the controller. The at least one program causes the controller to perform a method of i) concurrently firing the plurality of lights in the first light source set for a first time period while not firing any other light source set in the plurality of light source sets, ii) collecting light from the objective lens during all or a portion of the first time period using the two-dimensional pixelated detector, iii) concurrently firing the plurality of lights in the second light source set for a second time period while not firing any other light source set in the plurality of light source sets, and iv) collecting light from the objective lens during all or a portion of the second time period using the two-dimensional pixelated detector, thereby forming at least one digital image.

In some embodiments, a single digital image is formed from a combination of the collecting ii) and the collecting iv).

In some embodiments, a first digital image is formed from the collecting ii) and a second digital image is formed from the collecting vi).

In some embodiments, the uniform radial distribution forms at least one concentric circle about the objective lens.

In some embodiments, each light source set in the plurality of light source sets consist of n light sources, where n is a positive integer greater than or equal to two. Each light source of a respective light source set is arranged with $\theta_1$ degrees of separation to another light source of the respective light source set, where $$\theta_1 = \frac{360}{n}.$$

In some embodiments, a respective light source of each respective light source set is disposed at a same location.

In various embodiments, each light source of the respective light source set in the plurality of light source sets is arranged with $\theta_2$ degrees of separation from an adjacent light source of a different light source set in the plurality of light source sets, wherein $$\theta_2 = \frac{360}{kn}$$

and k is a number of light source sets.

In some embodiments, a wavelength spectra of emitted light from the plurality of light source sets is substantially limited by a plurality of optical filters. Each light source in the first light source set is filtered by a different bandpass filter in a first plurality of bandpass filters such that each bandpass filter in the first plurality of bandpass filters limits light emission to the first spectral range. Each light source in the second light source set is filtered by a different bandpass filter in a second plurality of bandpass filters such that each bandpass filter in the second plurality of bandpass filters limits light emission to the second spectral range.

In some embodiments, the plurality of optical filters comprises at least one longpass filter. In some embodiments, the plurality of optical filters comprises at least one shortpass filter.

In some embodiments, the first spectral range is 405±10 nanometers (nm) to 890±10 nm and the second wavelength band is 405±10 nm to 890±10 nm.

In some embodiments, the plurality of light source sets emit light at an intensity of 500 micro-candela (mcd) to 1500 mcd.

In some embodiments, the first time period is between 2 ms and 100 ms, and the second time period is between 2 milliseconds (ms) and 100 ms.

In some embodiments, a third light source set in the plurality of light source sets emits light that is substantially limited to a third spectral range or wavelength.

In some embodiments, k light source sets in the plurality of light source sets emit light that is substantially limited to k spectral ranges or wavelength(s).

In some embodiments, the objective lens is selected from the group consisting of a three dimensional (3D) binocular, a fiber optic, a fisheye lens, a macro lens, a microscopic lens, a normal lens, and a telephoto lens.

In some embodiments, the two-dimensional pixelated detector is selected from the group consisting of a charge-coupled device (CCD), a complementary metal-oxide-semiconductor (CMOS), a photo-cell, and a focal plane array.

In specific embodiments, the housing snap-fits to a mobile device.

In some embodiments, the imaging device is flush with a surface of the mobile device.

In various embodiments, the mobile device is selected from the group consisting of a smart phone, a personal digital assistant (PDA), an enterprise digital assistant, a tablet computer, and a digital camera.

1. Non-Transitory Computer Readable Storage Medium Embodiments. Another aspect of the present disclosure provides a non-transitory computer readable storage medium comprising instructions for execution by one or more processors to perform a hyperspectral/multispectral imaging regimen using a mobile device comprising the one or more processors, an objective lens, a two-dimensional pixelated detector in optical communication with the objective lens, and i light source sets, the instructions comprising, for each integer i in the set $\{1, \ldots, i, \ldots, k\}$, wherein k is a positive integer of two or greater. The instructions include instructions for instructing an $i^{th}$ plurality of lights uniformly radially distributed about the objective lens in the $i^{th}$ light source set in the plurality of light source sets to fire for an $i^{th}$ time period while not firing any other light source set in the plurality of light source sets. The instructions further include instructions for instructing the two-dimensional pixelated detector to collect light from the objective lens during all or a portion of the $i^{th}$ time period, thereby forming at least one digital image.

In some embodiments, the non-transitory computer readable storage medium includes instructions for instructing a plurality of lights uniformly radially distributed about the objective lens in a $k^{th}$ light source set in the plurality of light source sets to fire for a predetermined time period while not firing any other light source set in the plurality of light source sets. Further, the instructions include instructions for instructing the two-dimensional pixelated detector to collect a $k^{th}$ image during the predetermined time period, and combining at least the first through $k^{th}$ images to form a hyperspectral/multispectral image.

Disclosed Methods. Another aspect of the present disclosure provides a method for performing a hyperspectral/multispectral imaging regimen at a mobile device comprising one or more processors, memory storing one or more programs for execution by the one or more processors, an objective lens, a controller, a two-dimensional pixelated detector in optical communication with the objective lens, and a plurality of light source sets, attached to or integrated with the mobile device, comprising a first light source set in the plurality of light source sets and a second light source set in the plurality of light source sets. The one or more programs singularly or collectively instruct, through the controller, the first light source set in the plurality of light source sets to fire for a first time period. The one or more programs further instruct, through the controller, the two-dimensional pixelated detector to acquire a first image during the first time period. The one or more programs further instruct, through the controller, the second light source set in the plurality of light source sets to fire for a second time period. The one or more programs further instruct, through the controller, the two-dimensional pixelated detector to acquire a second image during the second time period. The one or more programs further combine at least the first image and the second image to form a hyperspectral/multispectral image.

In some embodiments, the second instance of instructing occurs concurrently with the first instance of instructing for a time period equal to the first time period plus the second time period, the third instance of instructing occurs subsequent completion of the first instructing, and the fourth instance of instructing is omitted.

In some embodiments, one or more programs instruct, through the controller, a $k^{th}$ light source set in the plurality of light source sets to fire for a predetermined time period, and instruct, through the controller, the two-dimensional pixelated detector to collect a $k^{th}$ image during the predetermined time period, and combining at least the first through $k^{th}$ images to form a hyperspectral/multispectral image.

The imaging device of the present invention has other features and advantages that will be apparent from, or are set forth in more detail in, the accompanying drawings, which are incorporated herein, and the following Detailed Description, which together serve to explain certain principles of exemplary embodiments of the present invention.

Figure 1:
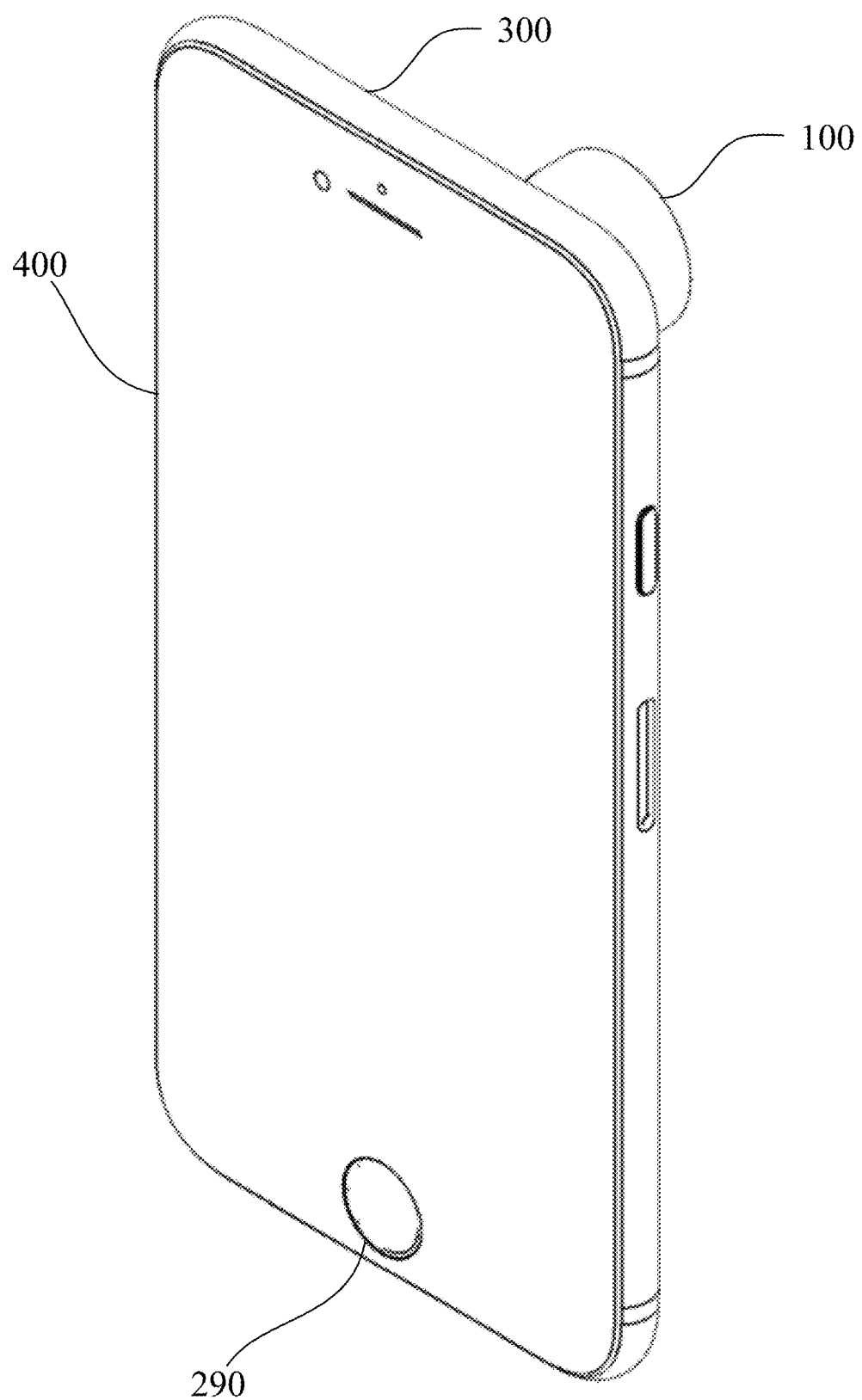
FIG. 1 is an isometric view of an imaging device according to an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject" and "user" are used interchangeably herein. Additionally, a first light source set could be termed a second light source set, and, similarly, a second light source set could be termed a first light source set, without departing from the scope of the present disclosure. The first light source set and the second light source set are both light source sets, but they are not the same light source set.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Furthermore, when a reference number is given an "$i^{th}$" denotation, the reference number refers to a generic component, set, or embodiment. For instance, a light source set termed "light source set 110-i" refers to the $i^{th}$ in a plurality of light source sets.

Various aspects of the present disclosure are directed to providing a hyperspectral/multispectral imaging device, a non-transitory computer readable storage medium comprising instructions for one or more programs to operate the given device, and a method thereof.

An imaging device of the present disclosure can be utilized in a plurality of fields and industries. In one implementation, an imaging device can be utilized for medical and skin care purposes. These uses comprise cosmetic applications, skin health and management, sun damage monitoring, acne progression and treatment effectiveness mapping, wrinkle management, treatment and topical application analysis, general dermatology, vascular analysis, three dimensional imaging, and the like. Cases can vary from capturing regions of interest as small as tens or hundreds of microns such as pore, blood vessel, and wrinkle detection to regions of interest of approximately 500 cm$^2$ for uses such as facial three dimensional mapping and imaging.

In another implementation, an imaging device of the present disclosure can be utilized for agriculture science. Agriculture science comprises normalized difference vegetation index (NDVI) calculation and more advance vegetation indices. In some embodiments, the imaging device comprises visible and infrared light which can be polarized to reduce adverse lighting effects. Regions of interest in agriculture science and geology cases can range from 1 m$^2$ or less such as an individual tree to hundreds of square meters such as a farm. In such large region of interest cases, an array of imaging devices can be utilized.

In another implementation, an imaging device of the present disclosure can be utilized for military and security purposes. Military and security purposes comprise biometrics such as border checkpoint security, facial alteration counter-measures, material absorption on skin, clothes, surfaces, and the like.

In one implementation, as described herein, a hyperspectral/multispectral imaging device, and method, is described that concurrently captures multiple images, wherein each image is captured in a predetermined spectral range.

In another implementation, as described herein, a hyperspectral/multispectral imaging device, and method, is described that captures an image in a predetermined time period and concurrently fires a plurality of light source sets during the predetermined time period. The present method allows multiple discrete spectral ranges or wavelengths to be captured in a single image. Thus, a subject does not need to maintain perfect alignment between the imaging device and a subject to capture a high quality hyperspectral image.

FIG. 1 illustrates an exemplary embodiment of a hyperspectral/multispectral imaging device 100, a housing 300 having an exterior and an interior, and a mobile device 400. In the present embodiment, the housing 300 is attached to the mobile device 400. In such embodiments, the housing 300 typically snap-fits to the mobile device 400; however, the present disclosure is not limited thereto. In some embodiments, the housing 300 is integrated, or embedded, with the mobile device 400.

Figure 2:
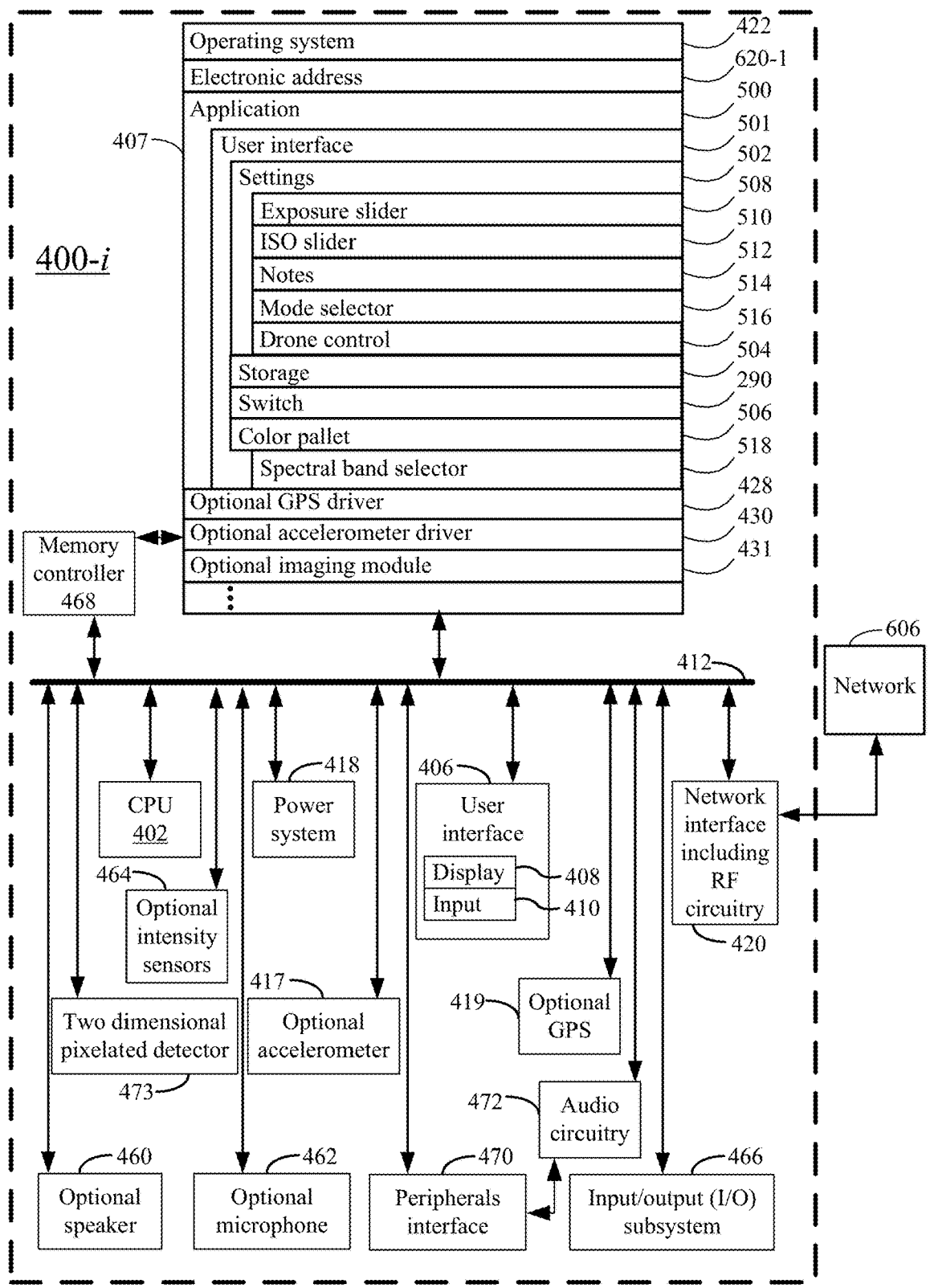
FIG. 2 illustrates a mobile device associated with an imaging device according to an exemplary embodiment of the present disclosure.

FIG. 2 provides a description of a mobile device 400 that can be used with the present disclosure. The mobile device 400 has one or more processing units (CPU's) 402, peripherals interface 470, memory controller 468, a network or other communications interface 420, a memory 407 (e.g., random access memory), a user interface 406, the user interface 406 including a display 408 and input 410 (e.g., keyboard, keypad, touch screen), an optional accelerometer 417, an optional GPS 419, optional audio circuitry 472, an optional speaker 460, an optional microphone 462, one or more optional intensity sensors 464 for detecting intensity of contacts on the device 102 (e.g., a touch-sensitive surface such as a touch-sensitive display system 408 of the device 102), optional input/output (I/O) subsystem 466, one or more communication busses 412 for interconnecting the aforementioned components, and a power system 418 for powering the aforementioned components.

In some embodiments, the input 410 is a touch-sensitive display, such as a touch-sensitive surface. In some embodiments, the user interface 406 includes one or more soft keyboard embodiments. The soft keyboard embodiments may include standard (QWERTY) and/or non-standard configurations of symbols on the displayed icons. In some embodiments, the mobile device 400 further comprises a display, and the method further comprises displaying the first image on the display. In some embodiments, and the displayed image is enlargeable or reducible by human touch to the touch screen. In some embodiments, the display is configured for focusing an image of a surface of a subject acquired by the two-dimensional pixelated detector.

Device 402 optionally includes, in addition to accelerometer(s) 417, a magnetometer and a GPS 419 (or GLONASS or other global navigation system) receiver for obtaining information concerning the location and orientation (e.g., portrait or landscape) of the mobile device 400.

It should be appreciated that the mobile device 400 is only one example of a multifunction device that may be used by users when engaging with imaging device 100, and that mobile device 400 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Memory 407 optionally includes high-speed random access memory and optionally also includes non-volatile memory, such as one or more magnetic disk storage devices, flash memory devices, or other non-volatile solid-state memory devices. Access to memory 407 by other components of mobile device 400, such as CPU(s) 407 is, optionally, controlled by memory controller 468.

Peripherals interface 470 can be used to couple input and output peripherals of the mobile device 400 to CPU(s) 402 and memory 407. The one or more processors 402 run or execute various software programs and/or sets of instructions stored in memory 407 to perform various functions for mobile device 400 and to process data.

In some embodiments, peripherals interface 470, CPU(s) 402, and memory controller 468 are, optionally, implemented on a single chip. In some other embodiments, they are, optionally, implemented on separate chips.

The RF (radio frequency) circuitry 420 of network interface 420 receives and sends RF signals, also called electromagnetic signals. RF circuitry 420 converts electrical signals to/from electromagnetic signals and communicates with communications networks and other communications devices via the electromagnetic signals. RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 420 optionally communicates with networks 606. In some embodiments, network circuitry does not include RF circuitry and, in fact, is connected to network 606 through one or more hard wires (e.g., an optical cable, a coaxial cable, or the like).

Examples of networks 606 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, audio circuitry 472, speaker 460, and microphone 462 provide an audio interface between a user and device 400. The audio circuitry 472 receives audio data from peripherals interface 470, converts the audio data to an electrical signal, and transmits the electrical signal to speaker 460. Speaker 460 converts the electrical signal to human-audible sound waves. Audio circuitry 472 also receives electrical signals converted by microphone 462 from sound waves. Audio circuitry 472 converts the electrical signal to audio data and transmits the audio data to peripherals interface 470 for processing. Audio data is, optionally, retrieved from and/or transmitted to memory 407 and/or RF circuitry 420 by peripherals interface 470.

In some embodiments, power system 418 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. In some embodiments, such as various embodiments where the housing 300 is integrated with the mobile device 400, battery 240, power management circuit 260, and communication interface 280 can be components of the mobile device 400, such as Power system 418 and network interface 420.

In some embodiments, the mobile device 400 optionally also includes one or more two-dimensional pixelated detectors 473. Two-dimensional pixelated detector 473 optionally includes a charge-coupled device (CCD), a complementary metal-oxide-semiconductor (CMOS) phototransistors, a photo-cell, and a focal plane array. Two-dimensional pixelated detector 473 receives light from the environment, and communicates with one or more lens, such as objective lens 210, and converts the light to data representing an image. In conjunction with imaging module 431 (also called a camera module), two-dimensional pixelated detector 473 optionally captures still images and/or video. In some embodiments, a two-dimensional pixelated detector is located on the back of mobile device 400, opposite display system 408 on the front of the device, so that the touch screen is enabled for use as a viewfinder for still and/or video image acquisition. In some embodiments, another two-dimensional pixelated detector is located on the front of the mobile device 400. In the exemplary embodiment, the two-dimensional pixelated detector is disposed within the housing 300.

As illustrated in FIG. 2, a device 400 preferably comprises an operating system 422 that includes procedures for handling various basic system services. Operating system 422 (e.g., iOS, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

In some embodiments, a device 400 further comprises an electronic address 620 (a mobile phone number, social media account, or e-mail address) associated with the corresponding user that is used in some embodiments by application 500 for communication.

In some embodiments, meta data is associated with captured multimedia, such as a device identifier (e.g., identifying the device of a group of devices that captured the multimedia item, which may include an arbitrary identifier, a MAC address, a device serial number, etc.), temporal meta data (e.g., date and time of a corresponding capture), location data (e.g., GPS coordinates of the location at which multimedia item was captured), a multimedia capture frequency (e.g., the frequency at which a stream of images is captured), device configuration settings (e.g., image resolution captured multimedia items, frequency ranges that the pixilated detector of a client device 104 is configured to detect), and/or other camera data or environmental factors associated with captured multimedia. Incorporated by reference in the present document are U.S. Pub. No.: 2017/0323472 METHODS AND SYSTEMS FOR SURFACE INFORMATICS BASED DETECTION WITH MACHINE-TO-MACHINE NETWORKS AND SMART PHONES, U.S. application Ser. No. 15/521,871 TEMPORAL PROCESSES FOR AGGREGATING MULTI DIMENSIONAL DATA FROM DISCRETE AND DISTRIBUTED COLLECTORS TO PROVIDE ENHANCED SPACE-TIME PERSPECTIVE, U.S. application Ser. No. 15/522,175 METHODS AND SYSTEMS FOR REMOTE SENSING WITH DRONES AND MOUNTED SENSOR DEVICES, and U.S. application Ser. No. 15/532,578 SWARM APPROACH TO CONSOLIDATING AND ENHANCING SMARTPHONE TARGET IMAGERY BY VIRTUALLY LINKING SMARTPHONE CAMERA COLLECTORS ACROSS SPACE AND TIME USING MACHINE-TO MACHINE NETWORKS.

In some embodiments, the device 400 further comprises an application 500 including user interface 501. In some embodiments, application 500 runs on native device frameworks, and is available for download onto devices 400 running operating systems 422 such as Android and iOS.

Figure 11:
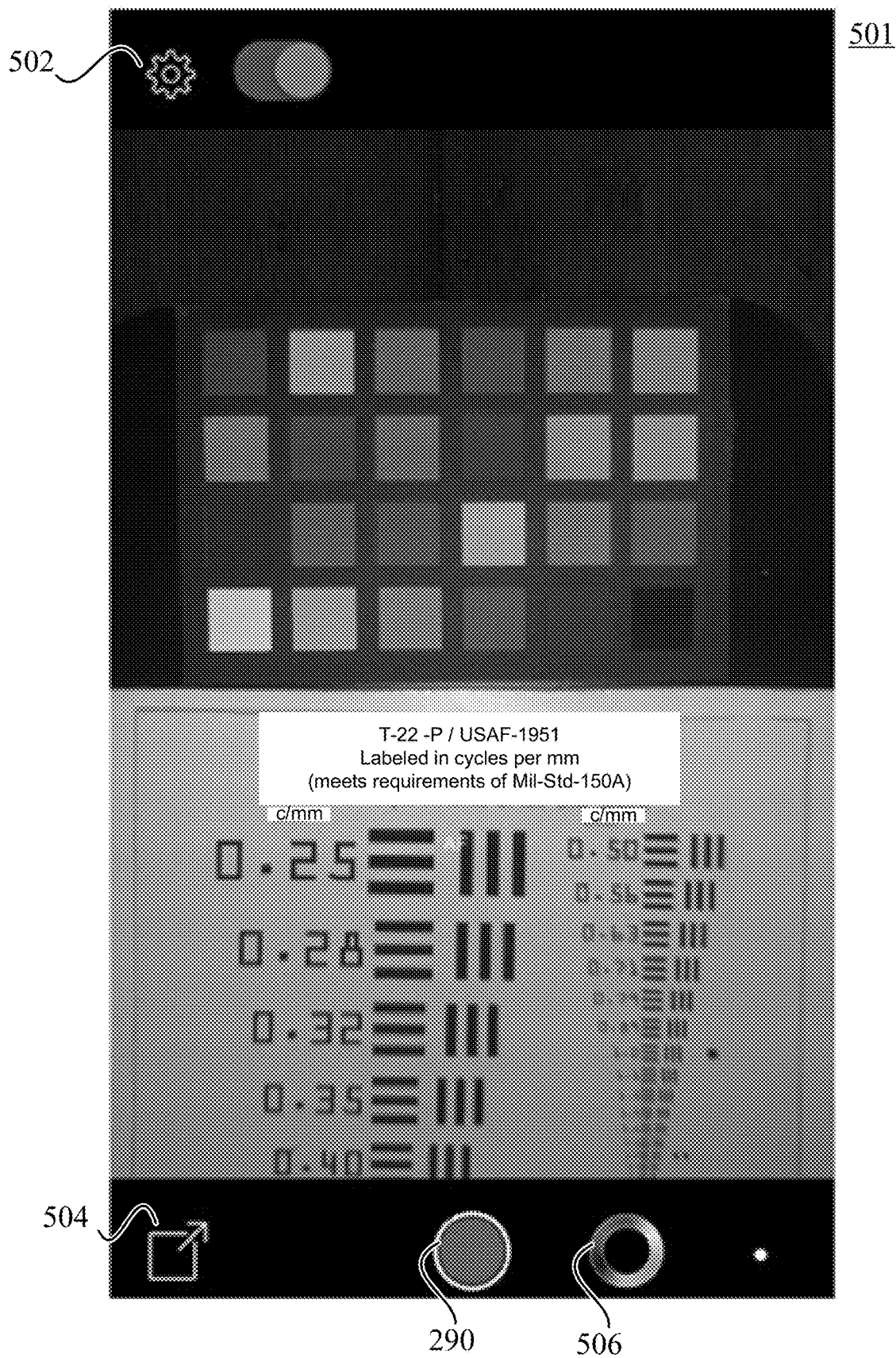
FIG. 11, FIG. 12, and FIG. 13 are illustrations of a user interface for at least one executable program according to an exemplary embodiment of the present disclosure.
Figure 12:
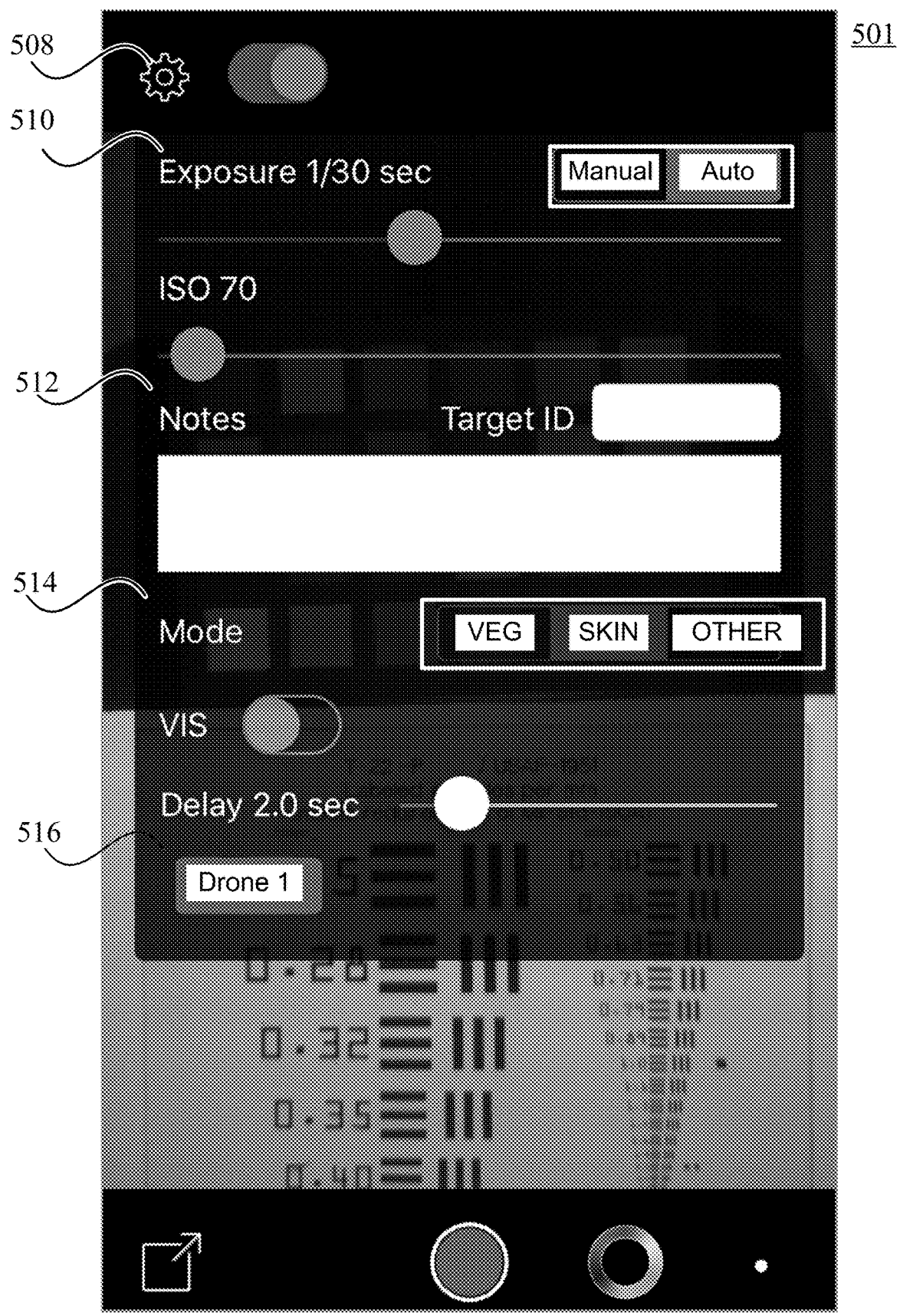
Figure 13:
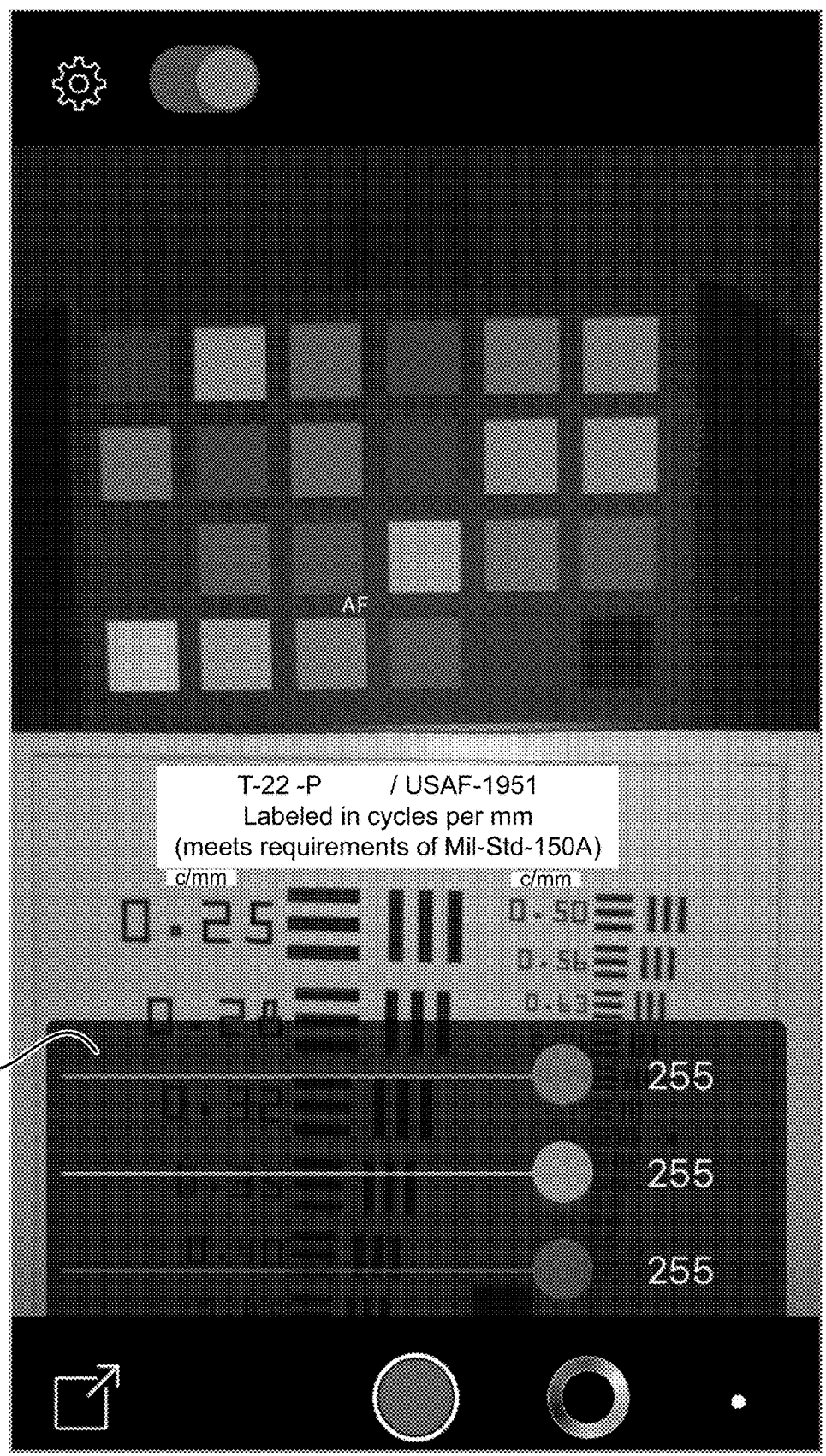

FIG. 11, FIG. 12, and FIG. 13 illustrate user interface 501 in accordance with an exemplary embodiment of the present disclosure. In some embodiments, user interface 501 includes settings 502, gallery or storage 504, fire or switch 290, and color pallet 506 including Spectral band selector slider 518. In some embodiments, settings 502 opens a menu or table, such as the interface shown in FIG. 12, of various options and customizable parameters to configured when taking a hyperspectral/multispectral image. Such options and parameters include Exposure time slider 508, ISO slider 510, notes area 512, subject mode selector 514, and remote drone control 516. In some embodiments, Exposure slider 508 allows a user to adjust the exposure time of an image from $\frac{1}{3200}$ of a second to 30 seconds. ISO slider 510 adjusts the ISO of an acquired image. In some embodiments, ISO slider can be adjusted to values in between 50 and 12,800. Notes area 512 is configured to allow a user or application 500 to input various text, images, videos, and the like. Mode selector 514 allows a user to adjust an acquired image according to various uses cases of the imaging device 100. In the exemplary embodiment, modes for agriculture and vegetation analysis, VEG, skin and medical analysis, SKIN, and other various uses are available for selection; however, the present discloser is not limited there to. Drone control 516 can be utilized in various embodiments where imaging device 100 is attached to a drone, or each imaging device in a plurality of imaging devices is attached to a respective drone in a plurality of drones. In such embodiments, swarm control and/or control of individual drone and respective devices can be manipulated through drone control 516. Spectral band selector slider 518 allows a user to manipulate spectral bands of emitted light. In the present embodiment, spectral band selector slider is a standard RGB 256-point slider; however, in other embodiments slider 518 can incorporate other spectral bands of the electromagnetic spectrum including, but not limited to, infrared light and ultraviolet light. In some embodiments, these options can be automatically adjusted and optimized according to various environmental factors or can be manually adjusted by a user of the device 400.

Figure 3:
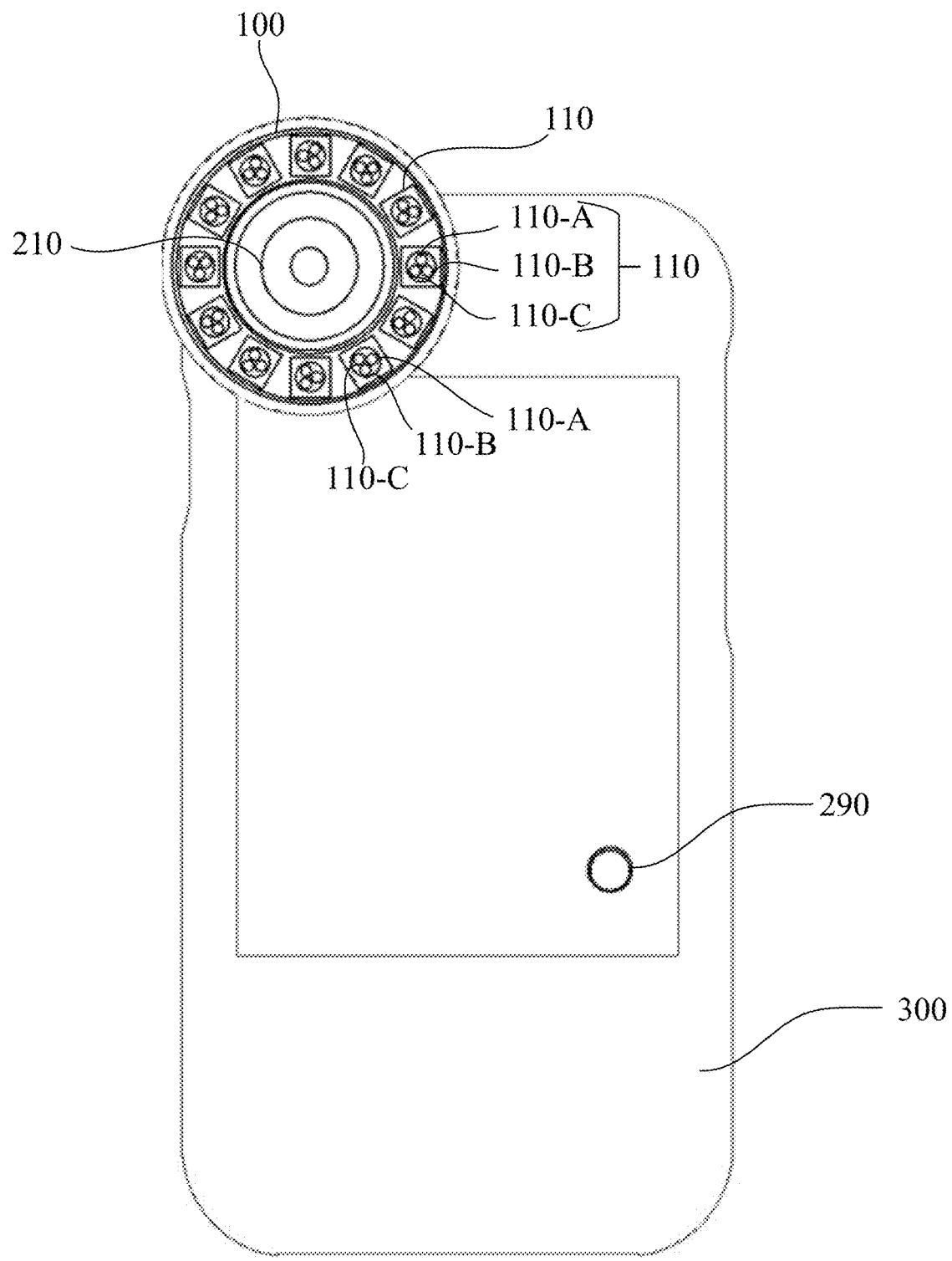
FIG. 3 a front schematic view of an imaging device according to an exemplary embodiment of the present disclosure.

In some embodiments, such as the embodiments shown in FIG. 1, FIG. 3, and FIG. 11, switch 290 is configured as a component of the mobile device 400, such as a home button. In some embodiments, switch 290 is configured to implement, fire, or execute a method or non-transitory computer readable storage medium comprising one or more programs of the imaging device 100. In some embodiments, the switch 290 is remoted activated. The remote activation can be achieved through a sensor, a plurality of sensors, an electronic communication, or a wireless transmission. Thus, a user can remotely operate the imaging device 100 from a distance. In some embodiments, such as the embodiment shown in FIG. 3, switch 290 a physical mechanism disposed on an external surface of the housing 300. In various embodiments, switch 290 can be configured as various ON/OFF mechanism such as a knob, a dial, a slide, and the like. In some embodiments, switch 290 is a power supply switch of the imaging device. In some embodiments, a plurality of switches 290 can exists. In some embodiments, switch 290

In some embodiments, the user interface 456 may include one or more soft keyboard embodiments. The soft keyboard embodiments may include standard (QWERTY) and/or non-standard configurations of symbols on the displayed icons.

Accordingly, a user interface according to an exemplary embodiment of the present disclosure achieves the advantages of allowing a user to optimize and customize generating a hyperspectral/multi spectral image.

It should be appreciated that device 400 is only one example of a portable multifunction device, and that device 400 optionally has more or fewer components than shown in FIG. 2, optionally combines two or more components, or optionally has a different configuration or arrangement of the components.

Figure 4:
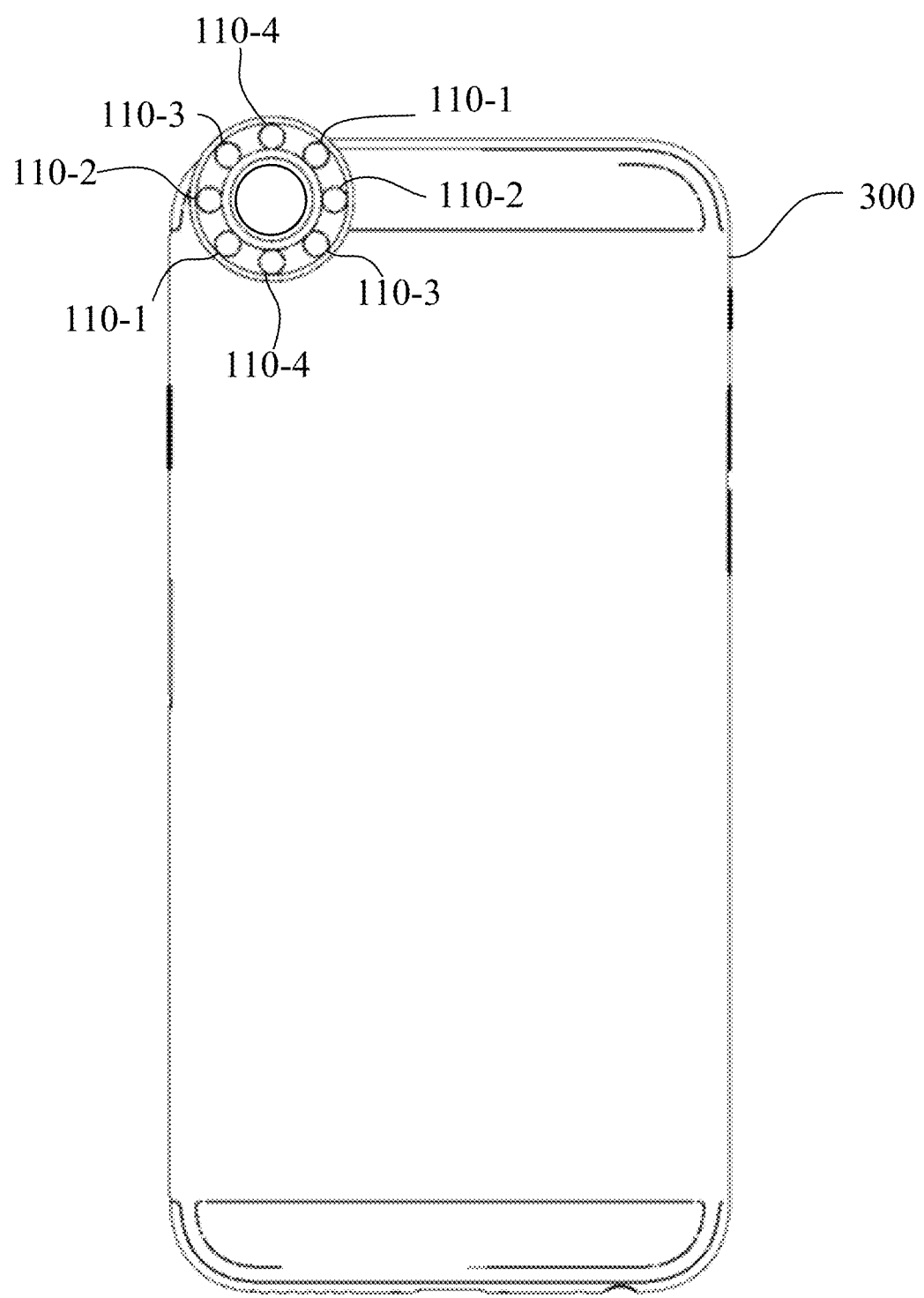
FIG. 4 is a front schematic view of an imaging device according to another exemplary embodiment of the present disclosure.
Figure 5:
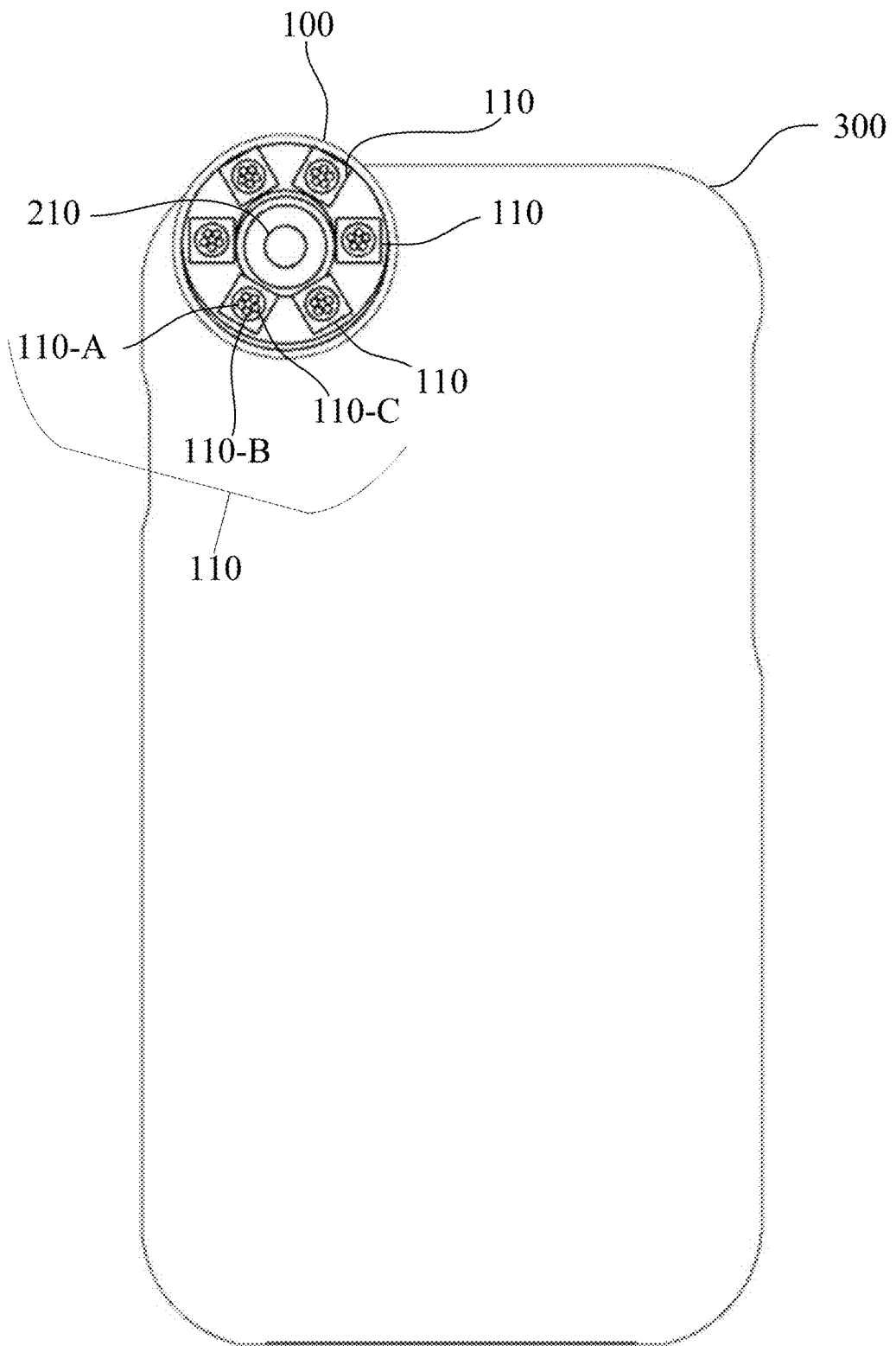
FIG. 5 is a front schematic view of an imaging device according to yet another exemplary embodiment of the present disclosure.

FIG. 3, FIG. 4, and FIG. 5 depict a front view of the imaging device 100 and the housing 300 according to various embodiments of the present disclosure.

Referring to FIG. 3, the imaging device 100 includes an objective lens 210. The objective lens 210 is disposed within the housing 300 and flush with a surface of the housing 300. Thus, the objective lens 210 does not substantially extend past the given surface of the housing 300. As illustrated in FIG. 3, a plurality of light source sets 110 is attached or integrated into the housing 300. Each respective light source set (110-A, 110-B, 110-C) in the plurality of light source sets 110 comprises a plurality of lights. Each plurality of lights is uniformly radially distributed about the objective lens 210. In some embodiments, the plurality of light sets 110 form a circle about the objective lens 210, however, the present disclosure is not limited thereto. For instance, in other embodiments each respective light source set (110-A, 110-B, 110-C) in the plurality of light source sets 110 can form a concentric circle about the objective lens 210. In such embodiments, there can exist k light source sets (110-A, 110-B, 110-C, 110-i, . . . , 110-k) in the plurality of light source sets forming a maximum of k concentric circles about the objective lens 210, where k is a maximum number of light source sets in the plurality of light source sets 110. In various embodiments, the plurality of lights source sets can form a plurality of arc segments about the objective lens 210. The arc segments can be uniform; however, the present disclosure is not limited there to so long as the plurality of light source sets are uniformly distributed about the objective lens 210.

In some embodiments, the objective lens 210 is a component of the mobile device 400; however, the present disclosure is not limited thereto. For instance, in some embodiments the objective lens 210 is a stand-alone device such as an auxiliary web camera. In various embodiments, the objective lens 210 is selected from the group consisting of a 3D binocular, a fiber optic, a fisheye lens, a macro lens, a microscopic lens, a normal lens, and a telephoto lens.

The type of objective lens and spacing of the plurality of light source sets varies greatly depending on application. For instance, an imaging device utilized for skin care and other small region of interest applications can have a region of interest ranging from 1 cm$^2$ to 10 cm$^2$ and a plurality of lights disposed with a diameter ranging in between 0.5 cm to 10 cm. An imaging device utilized for agriculture surveying and other large regions of interest applications care can have a region of interest ranging from 1 m$^2$ to hundreds of thousands of m$^2$ and a plurality of lights disposed with a diameter ranging in between 0.5 cm to 10 cm. In such large region of interest applications, a user may combine a plurality of imaging devices 100 into an array of imaging devices. In such an embodiment, the plurality of imaging devices form a plurality of light source sets, thus accomplishing the same objectives of a single imaging device of the present disclosure yet on a larger scale. Naturally, embodiments in between such micro and macroscopic regions of interest exist including Biometrics, materials analysis, materials detection, and the like. In some embodiments, the region of interest is any closed form shape (e.g., circular, elliptical, polygon, rectangular, etc.).

Figure 6:
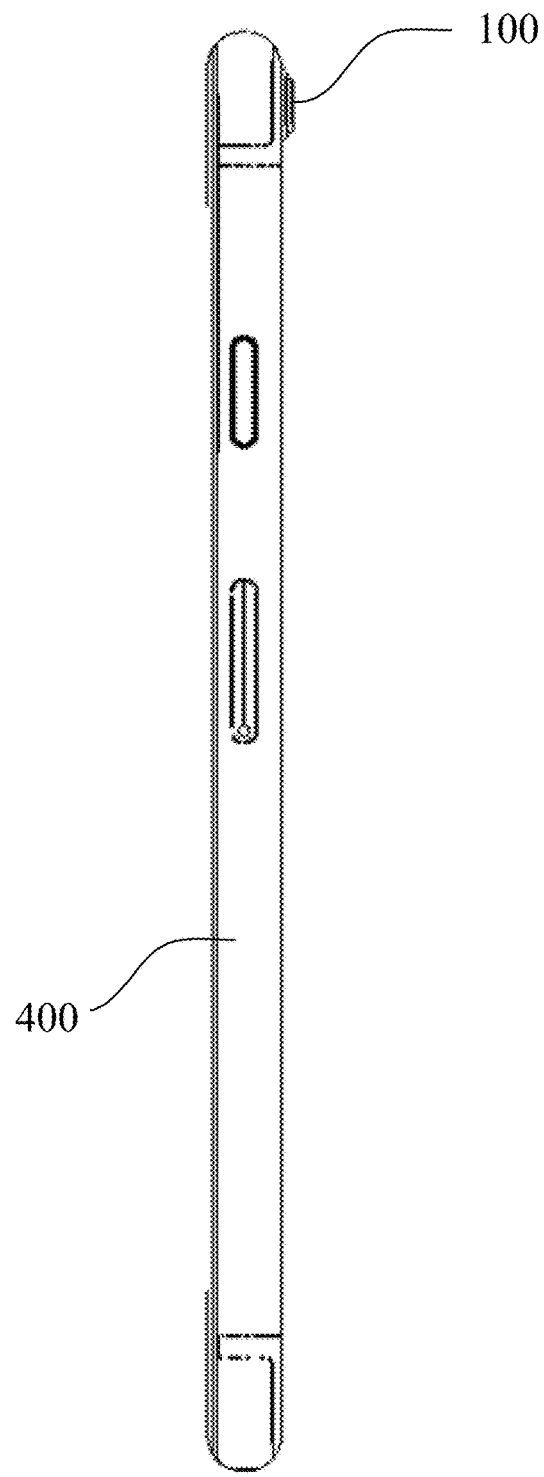
FIG. 6 is a side schematic view of an imaging device and a mobile device according to a further exemplary embodiment of the present disclosure.

FIG. 6 depicts an embodiment of the present disclosure where imaging device 100 is integrated with mobile device 400. In some embodiments, the plurality of light source sets, and thus the imaging device, is flush with a surface of the mobile device. The term "flush", as used herein, is defined as a surface of a first component and a same respective surface of a second component to have a distance or level separating the first component and the second component to be 0.0 cm, within a tolerance of 50 µm, within a tolerance of 0.1 mm, within a tolerance of 0.1 cm, or within a tolerance of 0.25 cm. In some embodiments, the same respective surface of the second component is coplanar to the surface of the first component. An imaging device considered to be flush with a mobile device can be either internally disposed within the mobile device or integrated with the mobile device.

Referring to FIG. 4, in some embodiments each light source set (110-1, 110-2, 110-3, 110-4) in the plurality of light source sets 110 contains a single light source. In the present embodiment, each single light source has a predetermined spectral range or wavelength. As such, each light source set (110-1, 110-2, 110-3, 110-4) in the plurality of light source sets 110 emits a unique spectral range or wavelength. Thus, the light source set 110-1 emits a first spectral range or wavelength, the light source 110-2 emits a second spectral range or wavelength, the light source 110-3 emits a third spectral range or wavelength, and the light source 110-4 emits a fourth spectral range or wavelength. For example, the light source set 110-1 can emit red light, the light source set 110-2 can emit blue light, the light source set 110-3 can emit green light, and the light source set 110-4 can emit infrared light; however, the present invention is not limited thereto. In some embodiments, each light source set 110 is characterized by (e.g., emits) a predetermined spectral range or wavelength. In some embodiments, each light source set 110 is characterized by a different spectral range or wavelength that does not overlap with the spectral range or wavelength of any of the other light source set 110. In some embodiments, each light source set 110 is characterized by a different spectral range that does not overlap with the spectral range of any of the other light source set 110. In some embodiments, each light source set 110 is characterized by a different spectral range and the different spectral range of at least one light source set 110 partially overlaps with the spectral range of another light source set 110. For instance, in some embodiments, a first source set 110 is characterized by a spectral range from x toy nm and a second first source set 110 is characterized by a spectral range from w to z nm, where w is between x and y.

In various embodiments, only a red spectral band light source set, a green light spectrum band light source set, and a blue light spectrum band light source set exists in the plurality of light source sets. In such embodiments, the imaging device further comprises a color detector. The color detector is configured to detect across the electromagnetic spectrum, specifically the visible light band in the present embodiment, and senses excitation light reflected from a region of interest. Red, green, and blue light wavelengths bands are distinct and can easily be differentiated from each other, thus the detector may detect a multi-modal distribution of light. The multi-modal distribution can be analyzed to determine the specific of wavelengths or spectral bands of light detected by the color detector. Thus, a single image can be captured, analyzed, and processes to produce a hyper-spectral/multispectral image.

The embodiment shown in FIG. 4 depicts four light source sets (110-1, 110-2, 110-3, 110-4); however, the present disclosure is not limited thereto. In a further embodiment, the imaging device 100 includes k sets of light sources sets (110-A, 110-B, 110-i, . . . , 110-k) in the plurality of light source sets 110, where k is a positive integer greater than or equal to two. In some embodiments, the imaging device 100 includes two light source sets in the plurality of light source sets 110. In another embodiment, the imaging device 100 includes four light source sets in the plurality of light source sets 110. In yet embodiment, the imaging device 100 include five light source sets in the plurality of light source sets, six light source sets in the plurality of light source sets, seven light source sets in the plurality of light source sets, eight light source sets in the plurality of light source sets, nine light source sets in the plurality of light source sets, ten light source sets in the plurality of light source sets, eleven light source sets in the plurality of light source sets, or twelve light source sets in the plurality of light source sets.

In some embodiments, various light source sets in the plurality of light source sets may share or overlap within a spectral range.

In specific embodiments, there exists a plurality of bandpass filters substantially limiting the light emitted by the plurality of light source sets 110. Each light source in the first light source set 110-1 is filtered by a different bandpass filter in a first plurality of bandpass filters. Each bandpass filter in the first plurality of bandpass filters limits light emission to the first spectral range. Additionally, each light source in the second light source set 110-2 is filtered by a different bandpass filter in a section plurality of bandpass filters. Each bandpass filter in the plurality of bandpass filters limits light emission to the spectral range. The same holds true for the third light source set 110-3, and the fourth light source set 110-4 up to the $k^{th}$ light source set.

In some embodiments, the plurality of bandpass filters includes at least one longpass filter. In some embodiments, the plurality of bandpass filters includes at least one short-pass filter.

In an exemplary embodiment of the present implementation, the plurality of light source sets each contains a single full spectrum light source. However, a different bandpass filter is disposed over each respective light source set in the plurality of light source sets. The pass bands of filters used in such implementations are based on the identity of the spectral bands to be imaged for created of the digital image.

In some embodiments, the unique spectral range of each light source set is defined by a given type of light source disposed therein. In some embodiments, the plurality of light source sets comprises full spectrum light sources. In another embodiment, the plurality of light source sets comprises partial spectrum light sources including, but not limited to, halogen light sources, tungsten light sources, fluorescent light sources, and/or a combination thereof. In some embodiments, the plurality of light source sets comprises stable LEDs, tunable LEDs, or a combination thereof. In some embodiments, the plurality of light source sets comprises 405±10 nm light sources, 475±10 nm light sources, 520±10 nm light sources, 570±10 nm light sources, 630±10 nm light sources, 660±10 nm light sources, 740±10 nm light sources, 890 nm±10 light sources, or a combination thereof. In some embodiments, the plurality of light source sets comprises 405±20 nm light sources, 475±20 nm light sources, 520±20 nm light sources, 570±20 nm light sources, 630±20 nm light sources, 660±20 nm light sources, 740±20 nm light sources, 890 nm±20 light sources, or a combination thereof. In some embodiments, the plurality of light source sets comprises 405±5 nm light sources, 475±5 nm light sources, 520±5 nm light sources, 570±5 nm light sources, 630±5 nm light sources, 660±5 nm light sources, 740±5 nm light sources, 890 nm±5 light sources, or a combination thereof. In some embodiments, the plurality of light source sets comprises light sources which vary in wavelength with time or a predetermined function.

In some embodiments, the plurality of light source sets comprises a laser light source or a plurality of laser light sources. In some embodiments, a plurality of spot readings is simultaneously compiled for each laser light source in plurality of laser light sources. Laser light sources are particularly useful when a subject or region of interest is a solid color.

In some embodiments, the plurality of light source sets comprises non-polarized light sources, polarized light sources, or a combination thereof. In some embodiments, the polarized light sources include linear polarized sources, cross polarized sources, circular polarized sources, or a combination thereof. In some embodiments, rather than emitting polarized light, the imaging device 100 is configured to received polarized light.

In some embodiments, the first spectral range and the $k^{th}$ spectral range overlap but do not coexist. In other embodiments, the first spectral range and the $k^{th}$ spectral range overlap. In some embodiments, each spectral range in the plurality of spectral ranges is engineered for a specific predetermined wavelength or spectral range.

In some embodiments, emitted light has a radiant flux in between 5 milliwatts (mW) and 95 mW. In some embodiments, emitted light has a radiant flux in between 10 mW and 75 mw. In some embodiments, emitted light has a radiant flux in between 1 mW and 100 mW. In some embodiments, emitted light has a radiant flux in between 50 mW and 1000 mW. In some embodiments, emitted light has a radiant flux in between 0.01 mW and 100 mW.

In one implementation, particularly skin care uses, the imaging device 100 is configured to collect a set of images, where each image is collected at a discrete spectral band and time period, and the set of images comprises images collected at any two or more, any three or more, any four or more, any five or more, or all of the set of discrete spectral bands having central wavelengths {475±10 nm, 520±10 nm, 570±10 nm, 630±10 nm, 660±10 nm, 740±10 nm, and 890 nm±10}. In some embodiments of this implementation, a first light source set in the plurality of light source sets emits light which has a wavelength of 630±10 nm with an intensity of 1000 mcd for 2 ms, a second light source set in the plurality of light source sets emits light which has a wavelength of 520±10 nm with an intensity of 2000 mcd for 4 ms, and a third light source set in the plurality of light source sets emits light which has a wavelength of 405±10 nm with an intensity of 1000 mcd for 8 ms. In some embodiments of this implementation, a first light source set in the plurality of light source sets emits light which has a wavelength of 630±20 nm with an intensity of 1000 mcd for 2 ms, a second light source set in the plurality of light source sets emits light which has a wavelength of 520±20 nm with an intensity of 2000 mcd for 4 ms, and a third light source set in the plurality of light source sets emits light which has a wavelength of 405±20 nm with an intensity of 1000 mcd for 8 ms. In some embodiments of this implementation, a first light source set in the plurality of light source sets emits light which has a wavelength of 630±5 nm with an intensity of 1000 mcd for 2 ms, a second light source set in the plurality of light source sets emits light which has a wavelength of 520±5 nm with an intensity of 2000 mcd for 4 ms, and a third light source set in the plurality of light source sets emits light which has a wavelength of 405±5 nm with an intensity of 1000 mcd for 8 ms. The above exposure times are not meant to significantly limit the present disclosure. For instance, in some embodiments each exposure time can vary by ±1 ms.

In another embodiment of the present implementation, a first light source set in the plurality of light source sets emits light which has a wavelength of 475±10 nm with a radiant flux of 30 mW, a second light source set in the plurality of light source sets emits light which has a wavelength of 570±10 nm with a radiant flux of 5 mW, a third light source set in the plurality of light source sets emits light which has a wavelength of 660±10 nm with a radiant flux of 9 mW, a fourth light source set in the plurality of light source sets emits light which has a wavelength of 740±10 nm with a radiant flux of 95 mW, and a firth light source set in the plurality of light source sets emits light which has a wavelength of 890±10 nm with a radiant flux of 40 mW. In a further embodiment, each of the above wavelengths may further vary by ±5 nm or ±10 nm.

Figure 7:
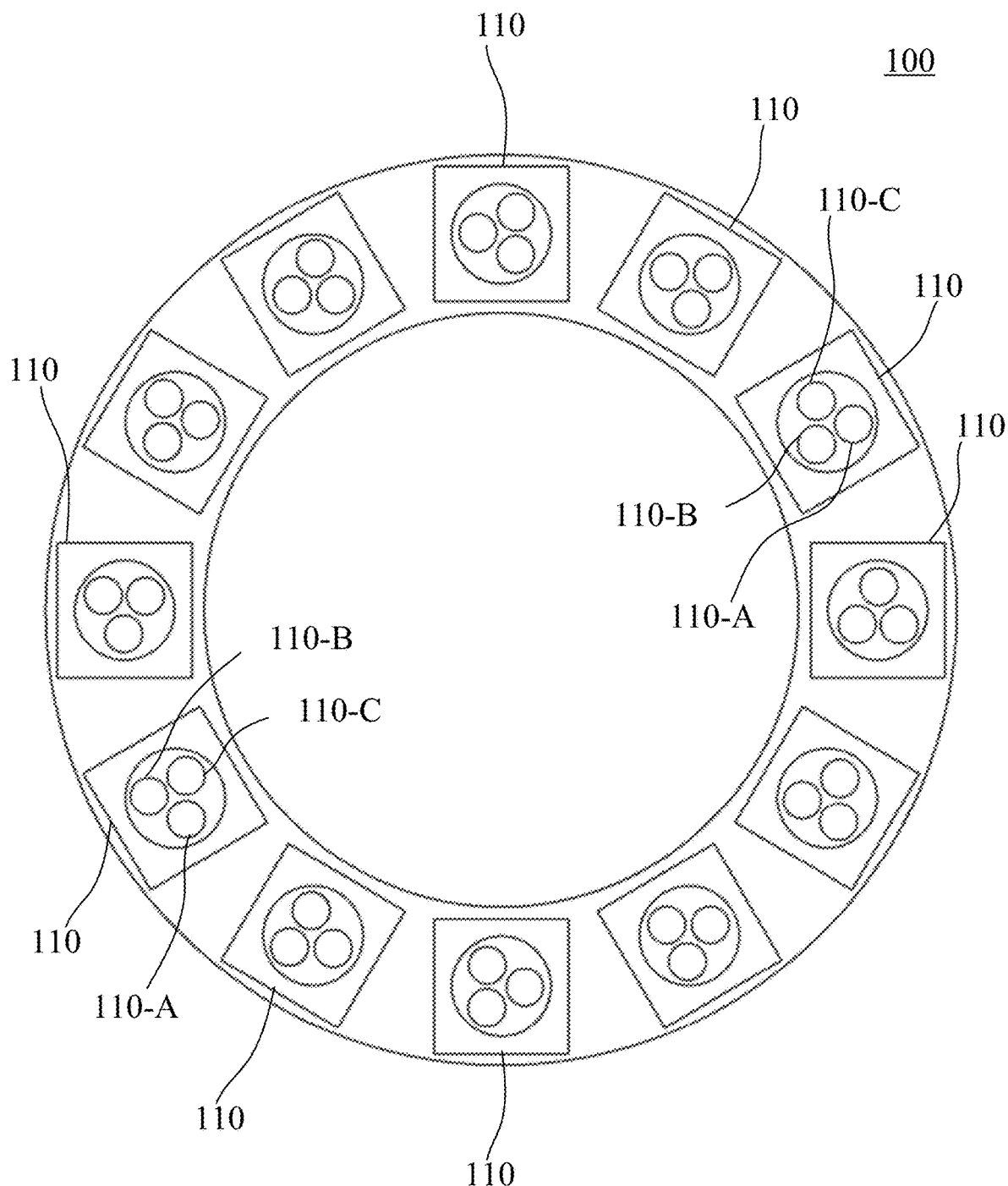
FIG. 7 is an enlarged schematic view of a plurality of light source sets according to an exemplary embodiment of the present disclosure.

In another embodiment, such as the embodiments shown in FIG. 5 and FIG. 7, the plurality of light source sets 110 comprise a plurality of clusters comprising the plurality of light source sets (110-A, 110-B, 110-C, ..., 110-k). In such an embodiment, when each light source set (110-A, 110-B, 110-C, ..., 110-k) is fired, the entire uniform radial distribution of lights can be illuminated. In other embodiments, uniformly distributed regions of the imaging device can be illuminated.

Figure 8:
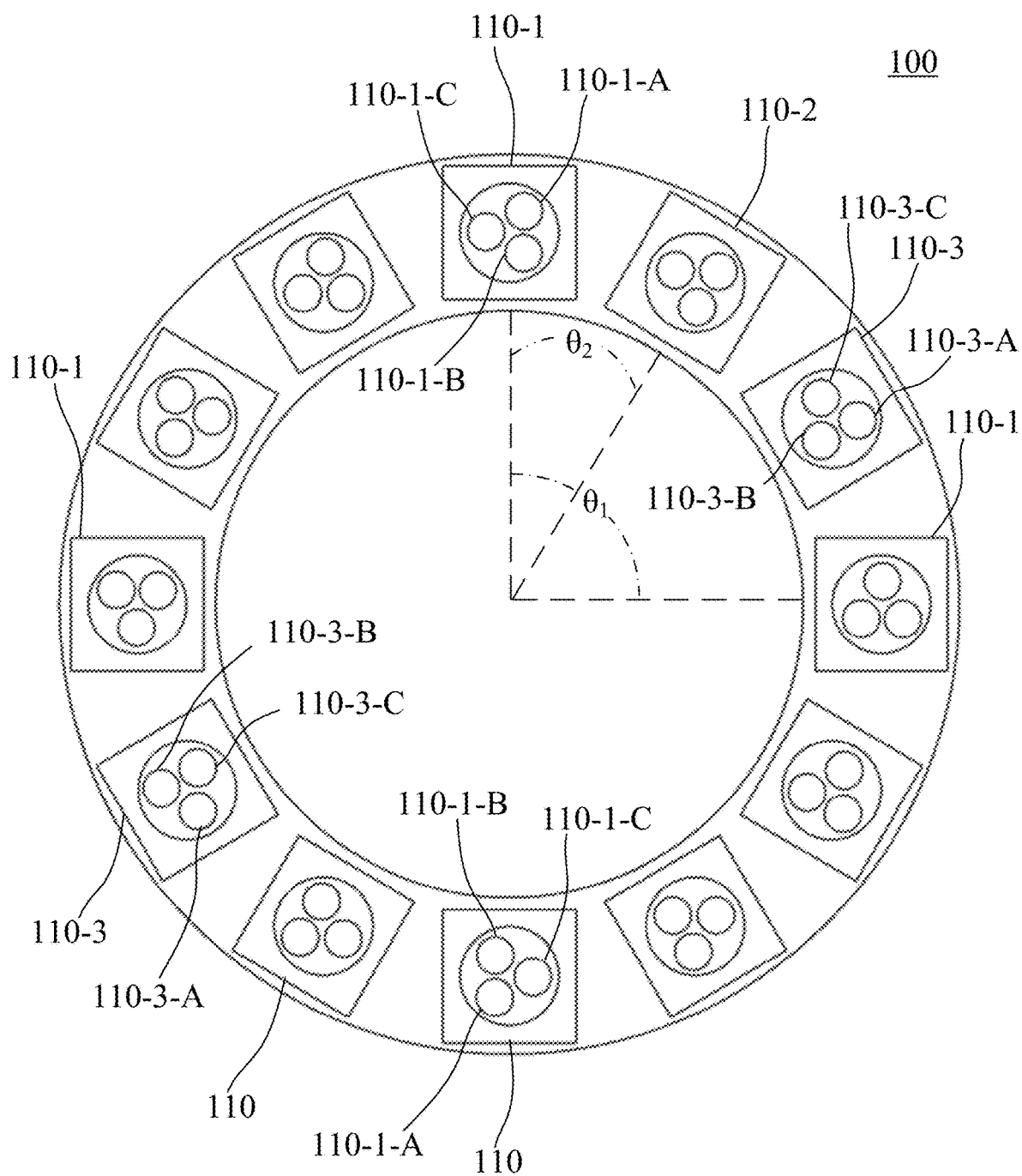
FIG. 8 is an enlarged schematic view of a plurality of light source sets according to another exemplary embodiment of the present disclosure.
Figure 9:
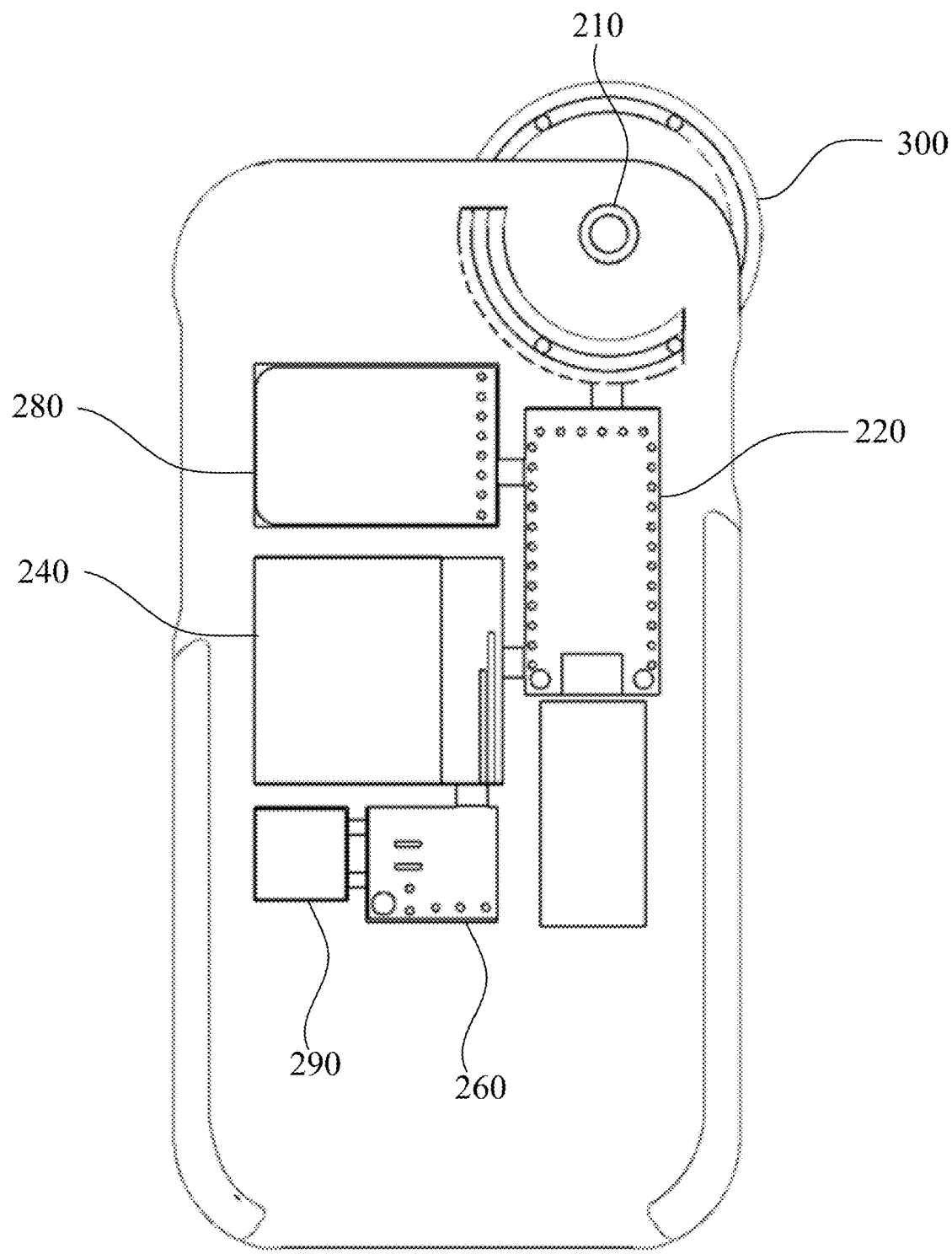
FIG. 9 is a rear schematic view of an imaging device according to an exemplary embodiment of the present disclosure.

Referring to FIG. 8, there can exist a plurality of light source sets (110-1, 110-2, 110-3) in the plurality of light source sets 110. Each light source set (110-1, 110-2, 110-3) in the plurality of light source sets 110 can consists of n light sources, where n is a positive integer. In the present embodiment, each light source set (110-1, 110-2, 110-3) comprises a plurality of lights (110-i-A, 110-i-B, 110-i-C, ..., 110-i-n). As such, each plurality of light sources of a respective light source set (110-1, 110-2, 110-3) in the plurality of light source sets 110, is disposed with $\theta_1$ degrees of separation to another plurality of light sources of the respective light source set (110-1, 110-2, 110-3) in the plurality of light source sets 110, where $$\theta_1 = \frac{360}{n}.$$

For example, in the present exemplary embodiment, each light source set (110-1, 110-2, 110-3) contains four plurality of light sources (e.g., there exist four iterations of 110-1), thus 90° of separation between each light source of a respective light source set.

Furthermore, in some embodiments, each plurality of lights (110-i-A, 110-i-B, 110-i-C, ..., 110-1-n) of a respective light source set (110-1, 110-2, 110-3, ..., 110-i, 110-k) is arranged with $\theta_2$ degrees of separation, where $$\theta_2 = \frac{360}{kn},$$

and k is a total number of light source sets, from an adjacent plurality of light sources of a different light source set in the plurality of light source sets. For example, in the present embodiment, there are three total light source sets (110-1, 110-2, 110-3) each of which contains four plurality of lights. Thus, each plurality of lights of the respective light source set in the plurality of light source sets is arranged with 30° of separation from an adjacent plurality of lights of a different light source set in the plurality of light source sets.

In some embodiments, lights sources of each respective light source set in the plurality of light source sets are disposed at a same location. In such embodiments a theoretical $\theta_2$ is zero.

The above spatial relationships ensure that a uniform light distribution pattern is emitted towards a subject while minimizing adverse luminance and shadow effects.

In some implementations, each respective light source of a respective light source set (e.g., 110-1-A, 110-2-A, 110-3-A) includes a unique discrete spectral range or wavelength; however, the present disclosure is not limited thereto.

In some embodiments, battery 240, power management circuit 260, and communication interface 280 are disposed within the housing 300. In some embodiments, the battery 240 is a rechargeable battery.

In some embodiments, the communication interface 280 comprises a wireless signal transmission element and instructions are sent in accordance with a hyperspectral/multispectral imaging method by the wireless signal transmission element. In various embodiments, wireless signal transmission element is selected from the group consisting of a Bluetooth transmission element, a ZigBee transmission element, and a Wi-Fi transmission element.

In one implementation, the communication interface 280 comprises a first communications interface 280. The imaging device 100 is coupled to the mobile device 400, thereby bringing the first communications interface 280 in direct physical and electrical communication with a second communication interface of the mobile device 400, thereby enabling instructions to be sent directly to the second communications interface from the first communications interface 280 in accordance with a hyperspectral/multispectral imaging method.

As mentioned above, conventional hyperspectral/multispectral imaging devices require high-end optics which can costs tens of thousands of dollars per device. Accordingly, the present disclosure can be designed using generic, off the shelf components. For example, an embodiment of the present disclosure can comprise a NeoPixel—12×5050 RGB LED with Integrated Drivers, an Adafruit Pro Trinket—5 V 16 MHz controller, an Adafruit Bluefruit LE UART Friend—Bluetooth Low Energy (BLE) communication interface, an Adafruit Pro Trinket LiIon/LiPoly Backpack Add-on power management system, and an ON-OFF Power Button/Pushbutton Toggle Switch, (Adafruit Industries, New York, N.Y.). Additionally, a 3.7 V 520 mAh Lithium Polymer rechargeable DV 603030 1.92 wh 14F2B BPI battery may be purchased (Amazon.com, Inc, Seattle, Wash.). Furthermore, custom LEDs are readily available from various manufacturers, (Marktech Optoelectronics, Lathan, N.Y.).

The imaging device 100 also includes a controller 220. The controller 220 comprises at least one executable program non-transiently stored therein and is configured to control at least the plurality of light source sets 110. In some embodiments, the controller 220 is a component of the mobile device 400; however, the present disclosure is not limited thereto.

Figure 10:
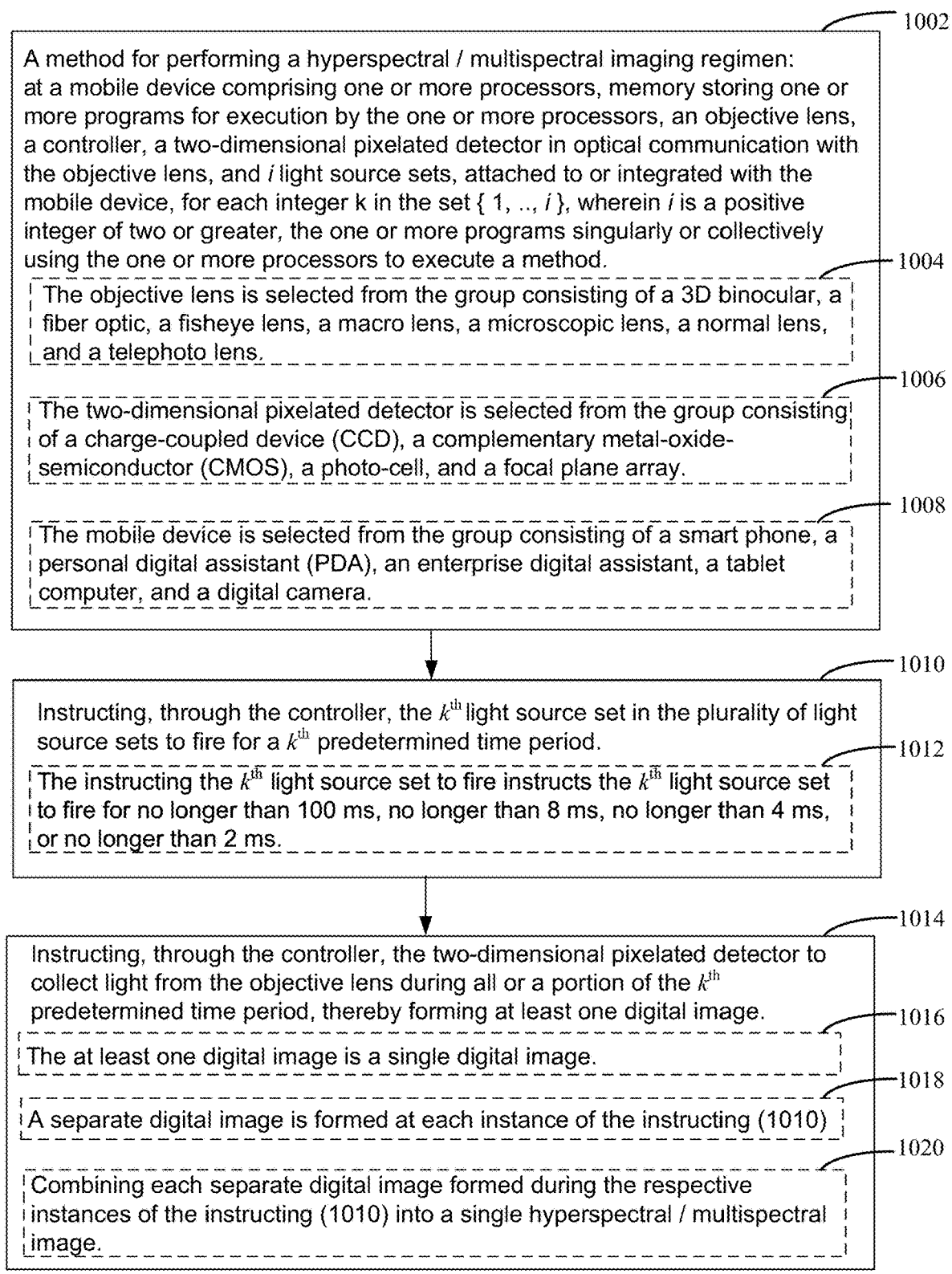
FIG. 10 collectively illustrates a flow chart of methods for imaging discrete wavelength bands using a device in accordance with an embodiment of the present disclosure, in which optional steps or embodiments are indicated by dashed boxes.

FIG. 10 collectively illustrates a flow chart of methods for imaging discrete wavelength bands using a device in accordance with an embodiment of the present disclosure. In the flow chart, the preferred parts of the methods are shown in solid line boxes whereas optional variants of the methods, or optional equipment used by the methods, are shown in dashed line boxes. As such, FIG. 10 illustrates methods for performing a hyperspectral/multispectral regime. The methods are performed at a device (e.g., mobile device 400) comprising one or more processors, memory storing one or more programs for execution by the one or more processors, an objective lens, a two-dimensional pixelated detector in optical communication with the objective lens, and i light source sets, the instructions comprising, for each integer i in the set $\{1, \ldots, i, \ldots, k\}$, wherein k is a positive integer.

As mentioned above, in various embodiments the imaging device 100 is attached to the mobile device 400. The one or more programs singularly or collectively execute the method (1002).

In some embodiments, the objective lens is selected from the group consisting of a 3D binocular, a fiber optic, a fisheye lens, a macro lens, a microscopic lens, a normal lens, and a telephoto lens (1004)

In some embodiments, the two-dimensional pixelated detector is selected from the group consisting of a charge-coupled device (CCD), a complementary metal-oxide-semiconductor (CMOS), a photo-cell, and a focal plane array (1006).

In some embodiments, the mobile device is selected from the group consisting of a smart phone, a personal digital assistant (PDA), an enterprise digital assistant, a tablet computer, and a digital camera (1008).

In accordance with the method, the one or more programs singularly or collectively instruct a $k^{th}$ plurality of lights uniformly radially distributed about the objective lens (e.g., objective lens 210 of FIG. 2) in the $k^{th}$ light source set to fire for a $k^{th}$ time period while not firing any other light source set in the plurality of light source sets (1010).

In some embodiments, the instructing the first light source set to fire instructs the kth light source set to fire for no longer than 100 ms, no longer than 8 ms, no longer than 4 ms, or no longer than 2 ms (1012).

In accordance with the method, the one or more programs singularly or collectively instruct the two-dimensional pixelated detector to collect light from the objective lens during all or a portion of the $k^{th}$ predetermined time period, thereby forming at least one digital image (1014).

In some embodiments, the at least one digital image is a single digital image (1016).

In some embodiments, a separate image is formed at each instance of the instructing 1010 (1018).

In some embodiments, the one or more programs singularly or collectively combine each separate digital image formed during the respective instances of the instructing 1010 into a single hyperspectral/multispectral image.

Figure 14C:
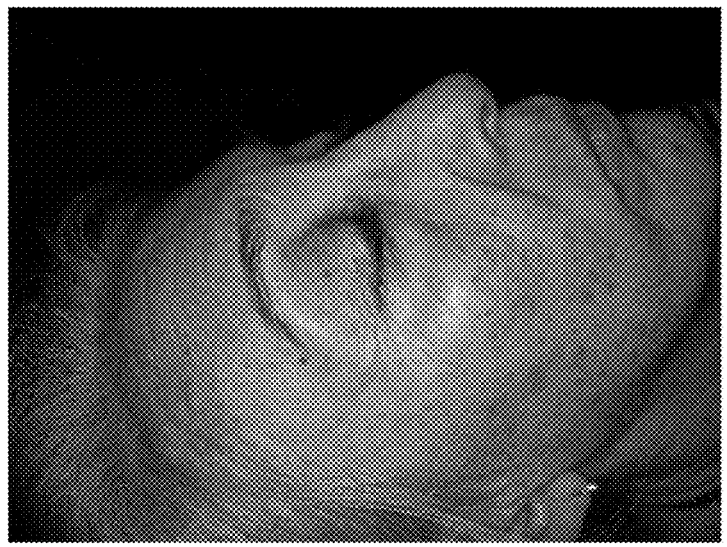
FIG. 14A, FIG. 14B, FIG. 14C, FIG. 14D, and FIG. 14E represent various images according to an exemplary embodiment of the present disclosure.
Figure 14B:
Figure 14A:
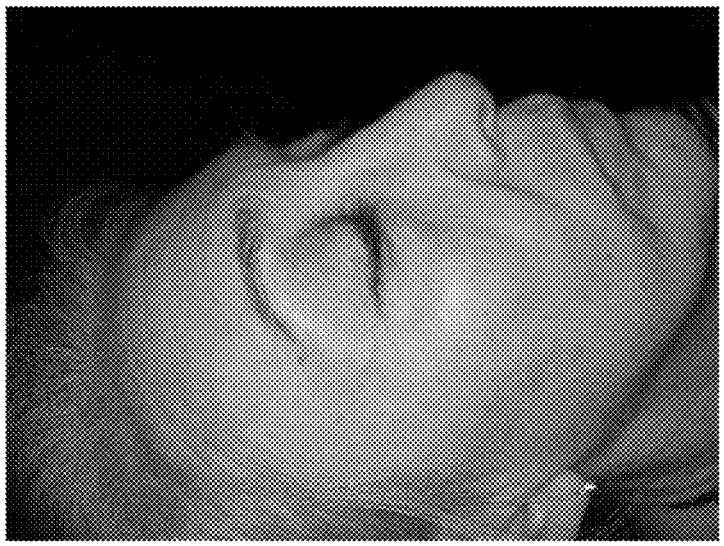
Figure 14E:
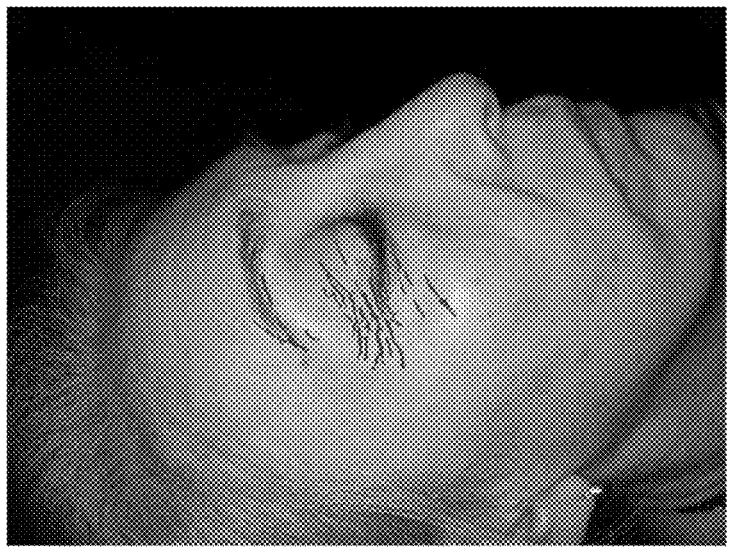
Figure 14D:

FIG. 14A through FIG. 14E illustrate various images and stages of image processing according to an exemplary embodiment of the present disclosure. In the present exemplary embodiment, the imaging device of the present disclosure is utilized for instantaneous wrinkle detection; however, the present disclosure may also be utilized for time lapse utilizations and the like. FIG. 14A illustrates an RGB image of a subject capture by the imaging device of the present disclosure. The image of FIG. 14A is then processed into the images of FIG. 14B and FIG. 14C, each of which comprise a discrete spectral band. Such processing can include 16 bit TIFF. The images of FIG. 14B and FIG. 14C are subsequently transformed to produce the image of FIG. 14D. Additional analysis and layer of the previous images of FIG. 14A to FIG. 14D are utilized to produce a final image of FIG. 14E. In the present embodiment, in order to detect and differentiate wrinkles, various parameters are considered including, but not limited to, total area per wrinkle which is a number of pixels classified as a wrinkle, percent area as wrinkle vs total area of a given region of interest, average length of a feature, average width of a feature, and type classification (e.g., fine, medium, coarse). The above are conducted through applications of advanced remote sensing techniques, custom detection algorithms, and scientific calibration protocols. Such applications allow automated generated output on scale through an advanced workflow architecture incorporating advanced spatial, spectra and temporal components. The images are rendered and adjustable using false color schematics or hybrid overlay views.

Imaging devices of the present discloser enable a user to acquire a hyperspectral/multispectral image of a wide range of regions of interest, from small scale images such as pores on a person's face to large scale images such as farms and geological formations. Another advantage of the present invention is ability to increase the energy of a system by providing high illuminance in order to generate a high quality hyperspectral/multispectral image. Furthermore, the present disclosure can be provided at a reduced manufacturing costs.

For convenience in explanation and accurate definition in the appended claims, the terms "upper", "lower", "up", "down", "upwards", "downwards", "inner", "outer", "inside", "outside", "inwardly", "outwardly", "interior", "exterior", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An imaging device, comprising:
A) a housing having an exterior and an interior;
B) an objective lens within the housing and flush with a surface of the housing so that the objective lens does not extend past the surface of the housing within a tolerance of 0.25 centimeters;
C) a plurality of light source sets attached or integrated into the housing, wherein each respective light source set in the plurality of light sources sets comprises a plurality of lights that is uniformly radially distributed about the objective lens, wherein:
a first light source set in the plurality of light source sets emits light that is limited to a first spectral range, and
a second light source set in the plurality of light source sets emits light that is limited to a second spectral range other than the first spectral range;
D) a single two-dimensional pixelated detector within the housing and in optical communication with the objective lens; and
E) a controller, wherein at least one program is non-transiently stored in the controller and executable by the controller, the at least one program causing the controller to perform the method of:
i) concurrently firing the plurality of lights in the first light source set for a first time period while not firing any other light source set in the plurality of light source sets,
ii) collecting light from the objective lens during all or a portion of the first time period using the two-dimensional pixelated detector,
iii) concurrently firing the plurality of lights in the second light source set for a second time period while not firing any other light source set in the plurality of light source sets, and
iv) collecting light from the objective lens during all or a portion of the second time period using the two-dimensional pixelated detector, thereby forming at least one digital image.

2. The imaging device of claim 1, wherein the uniform radial distribution is at least one concentric circle about the objective lens.

3. The imaging device of claim 1, wherein:
each light source set in the plurality of light source sets consist of n light sources, wherein n is a positive integer of value two or greater, and
each light source of a respective light source set is arranged with $\theta_1$ degrees of separation to another light source of the respective light source set, wherein $$\theta_1 = \frac{360}{n}.$$

4. The imaging device of claim 3, wherein a respective light source of each respective light source set is disposed at a same location.

5. The imaging device of claim 3, wherein:
the plurality of light source sets consists of k light source sets,
k is a positive integer of two or greater, and
each light source of the respective light source set is arranged with $\theta_2$ degrees of separation from an adjacent light source of a different light source set, wherein $$\theta_2 = \frac{360}{kn}.$$

6. The imaging device of claim 1, wherein a wavelength spectra of emitted light from the plurality of light source sets is limited by a plurality of optical filters.

7. The imaging device of claim 1, wherein
each light source in the first light source set is filtered by a different bandpass filter in a first plurality of bandpass filters,
each bandpass filter in the first plurality of bandpass filters limits light emission to the first spectral range,
each light source in the second light source set is filtered by a different bandpass filter in a second plurality of bandpass filters, and
each bandpass filter in the second plurality of bandpass filters limits light emission to the second spectral range.

8. The imaging device of claim 6, wherein the plurality of optical filters comprises at least one longpass filter.

9. The imaging device of claim 6, wherein the plurality of optical filters comprises at least one shortpass filter.

10. The imaging device of claim 1, wherein the first spectral range is 405 nanometers (nm) ±10 nm to 890 nm ±10 nm and the second wavelength band is 405 nm ±10 nm to 890 nm ±10 nm.

11. The imaging device of claim 1, wherein the plurality of light source sets emit light at an intensity of 500 micro-candela to 1500 micro-candela.

12. The imaging device of claim 1, wherein
the first time period is between 1 millisecond and 100 milliseconds, and
the second time period is between 1 millisecond and 100 milliseconds.

13. The imaging device of claim 1, further comprising:
a third light source set in the plurality of light source sets that emits light that is limited to a third spectral range other than the first spectral range or the second spectral range.

14. The imaging device of claim 5, wherein
the plurality of light source sets collectively emit light that is limited to k spectral ranges.

15. The imaging device of claim 1, wherein a single digital image is formed from a combination of the collecting ii) and collecting iv).

16. The imaging device of claim 1, wherein a first digital image is formed from the collecting ii) and a second digital image is formed from the collecting iv).

17. The imaging device of claim 1, wherein the objective lens is selected from the group consisting of a 3D binocular, a fiber optic, a fisheye lens, a macro lens, a microscopic lens, a normal lens, and a telephoto lens.

18. The imaging device of claim 1, wherein the two-dimensional pixelated detector is selected from the group consisting of a charge-coupled device (CCD), a complementary metal-oxide-semiconductor (CMOS), a photo-cell, and a focal plane array.

19. The imaging device of claim 1, wherein the housing snap-fits to a mobile device or is integral to the mobile device.

20. The imaging device of claim 19, wherein the imaging device is flush with a surface of the mobile device.

21. The imaging device of claim 19, wherein the mobile device is selected from the group consisting of a smart phone, a personal digital assistant (PDA), an enterprise digital assistant, a tablet computer, and a digital camera.

\* \* \* \* \*